(12) United States Patent
Matsubayashi et al.

(10) Patent No.: US 7,890,972 B2
(45) Date of Patent: Feb. 15, 2011

(54) APPARATUS FOR GENERATING ELECTRONIC PROGRAM GUIDES AND CONTROL METHOD THEREFOR

(75) Inventors: Kazuhiro Matsubayashi, Yokohama (JP); Kazuna Maruyama, Fuchu (JP); Koji Mito, Kawasaki (JP); Hirofumi Urabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 770 days.

(21) Appl. No.: 11/847,625

(22) Filed: Aug. 30, 2007

(65) Prior Publication Data
US 2008/0060007 A1 Mar. 6, 2008

(30) Foreign Application Priority Data
Sep. 6, 2006 (JP) .............................. 2006-241336

(51) Int. Cl.
H04N 5/455 (2006.01)
(52) U.S. Cl. ....................................................... 725/38
(58) Field of Classification Search .................. 725/38, 725/52; 715/808
See application file for complete search history.

(56) References Cited

U.S. PATENT DOCUMENTS

| 2002/0089546 A1 | 7/2002 | Kanevsk et al. |
| 2003/0184578 A1 | 10/2003 | Cowperthwaite |
| 2004/0148629 A1* | 7/2004 | Shibamiya et al. ............ 725/53 |
| 2007/0150833 A1* | 6/2007 | Kim ........................... 715/808 |

FOREIGN PATENT DOCUMENTS

| EP | 1126701 A | 8/2001 |
| JP | 2004-320503 A | 11/2004 |
| KR | 2003-0044008 | 6/2003 |
| WO | 02/47467 A2 | 6/2002 |
| WO | WO2006/049150 A | 5/2006 |

OTHER PUBLICATIONS

Tsuhara, S. Ed, Institute of Electrical and Electronic Engineers, "Automatic Window Rearrangement Using Fuzzy Rules", 1995 Fourth IEEE International Conference on Universal Personal Communications Record, Nov. 6, 1995, pp. 682-686, XPO10160627.

* cited by examiner

Primary Examiner—Andrew Y Koenig
Assistant Examiner—Alfonso Castro
(74) Attorney, Agent, or Firm—Canon U.S.A., Inc., IP Division

(57) ABSTRACT

In an EPG generating apparatus, a controller specifies a program which meet a predetermined condition and extends the display area of the specified program as a popup portion. When extending the display area of a specified program, the controller changes the configuration of the display area of the specified program so that the display area of the specified program does not overlap the display area of another specified program positioned close to the display area of the specified program.

9 Claims, 21 Drawing Sheets

FIG. 7

| | CH1 | CH2 | CH3 | CH4 | CH5 | CH6 | CH7 | CH8 |
|---|---|---|---|---|---|---|---|---|
| 6 | 06:00 PROGRAM 11 PROGRAM DESCRIPTION... | 06:00 PROGRAM 21 06:15 PROGRAM 22 PROGRAM DESCRIPTION... | 06:00 PROGRAM 31 PROGRAM DESCRIPTION... 06:30 PROGRAM 32 AM DESCRIPTION... 06:45 PROGRAM 33 AM DESCRIPTION... | 06:00 PROGRAM 41 PROGRAM DESCRIPTION... 06:30 PROGRAM 42 06:45 PROGRAM 43 PROGRAM DESCRIPTION... | 06:00 PROGRAM 51 06:15 PROGRAM 52 PROGRAM DESCRIPTION... | 06:00 PROGRAM 61 PROGRAM DESCRIPTION... 06:45 PROGRAM 62 | 06:00 PROGRAM 71 PROGRAM DESCRIPTION... | 06:00 PROGRAM 81 PROGRAM DESCRIPTION... |
| 7 | 06:30 PROGR DESCRI 07:00 PROGR DESCRI 07:45 PROGR 08:00 PROGR PROGRAM DESCRIPTION... | 07:00 PROGRAM 23 PROGRAM DESCRIPTION... | | | 07:30 PROGRAM 54 PROGRAM DESCRIPTION... | 07:00 PROGRAM 63 PROGRAM DESCRIPTION... | 07:00 PROGRAM 72 PROGRAM DESCRIPTION... | 07:00 PROGRAM 82 PROGRAM DESCRIPTION... |
| 8 | | | 08:00 PROGRAM 44 PROGRAM DESCRIPTION... | | | 08:00 PROGRAM 64 PROGRAM DESCRIPTION... | | |
| 9 | 09:30 PROGRAM 16 PROGRAM DESCRIPTION... | 09:00 PROGRAM 25 PROGRAM DESCRIPTION... | 09:00 PROGR DESCRI | | | 09:15 PROGRAM 66 PROGRAM DESCRIPTION... | 09:30 PROGRAM 73 PROGRAM DESCRIPTION... | |
| 10 | | 10:30 PROGRAM 26 PROGRAM DESCRIPTION... | 10:00 PROGRAM 35 PROGRAM DESCRIPTION... | | 11:00 PROGRAM 56 PROGRAM DESCRIPTION... | PROGRAM 67 AM DESCRIPTION... | | |
| 11 | 11:00 PROGRAM 17 PROGRAM DESCRIPTION... 11:45 PROGRAM 18 | 11:00 PROGRAM 27 PROGRAM DESCRIPTION... 11:30 PROGRAM 28 PROGRAM DESCRIPTION... | 11:00 PROGR PROGR DESCRI | 11:00 PROGR PROGR DESCRI | | | | 07:00 PROGRAM 83 AM DESCRIPTION... |

FIG. 8

| | CH1 | CH2 | CH3 | CH4 | CH5 | CH6 | CH7 | CH8 |
|---|---|---|---|---|---|---|---|---|
| 6 | 06:00 PROGRAM 11 PROGRAM DESCRIPTION... <br> 06:30 PROGRAM 12 PROGRAM DESCRIPTION... | 06:00 PROGRAM 21 PROGRAM DESCRIPTION... <br> 06:15 PROGRAM 22 PROGRAM DESCRIPTION... | 06:00 PROGRAM 31 PROGRAM DESCRIPTION... <br> 06:30 PROGRAM 32 PROGRAM DESCRIPTION... | 06:00 PROGRAM 41 PROGRAM DESCRIPTION... <br> 06:30 PROGRAM 42 PROGRAM DESCRIPTION... <br> 06:45 PROGRAM 43 PROGRAM DESCRIPTION... | 06:00 PROGRAM 51 PROGRAM DESCRIPTION... <br> 06:15 PROGRAM 52 PROGRAM DESCRIPTION... | 06:00 PROGRAM 61 PROGRAM DESCRIPTION... <br> 06:45 PROGRAM 62 | 06:00 PROGRAM 71 PROGRAM DESCRIPTION... | 06:00 PROGRAM 81 PROGRAM DESCRIPTION... |
| 7 | 07:00 PROGRAM 13 PROGRAM DESCRIPTION... <br> 07:45 PROGRAM 14 | 07:00 PROGRAM 23 PROGRAM DESCRIPTION... | 07:00 PROGRAM 33 PROGRAM DESCRIPTION... | | 07:00 PROGRAM 53 PROGRAM DESCRIPTION... <br> 07:30 PROGRAM 54 PROGRAM DESCRIPTION... | 07:00 PROGRAM 63 PROGRAM DESCRIPTION... | 07:00 PROGRAM 72 PROGRAM DESCRIPTION... | 07:00 PROGRAM 82 PROGRAM DESCRIPTION... |
| 8 | 08:00 PROGRAM 15 PROGRAM DESCRIPTION... | 08:00 PROGRAM 24 PROGRAM DESCRIPTION... | | 08:00 PROGRAM 44 PROGRAM DESCRIPTION... | | 08:00 PROGRAM 64 PROGRAM DESCRIPTION... | | |
| 9 | 09:30 PROGRAM 16 PROGRAM DESCRIPTION... | 09:00 PROGRAM 25 PROGRAM DESCRIPTION... | 09:00 PROGRAM 34 PROGRAM DESCRIPTION... | 09:30 PROGRAM 45 PROGRAM DESCRIPTION... | 09:00 PROGRAM 55 PROGRAM DESCRIPTION... | 09:00 PROGRAM 65 PROGRAM DESCRIPTION... <br> 09:15 PROGRAM 66 PROGRAM DESCRIPTION... | 09:30 PROGRAM 73 PROGRAM DESCRIPTION... | |
| 10 | | 10:30 PROGRAM 26 PROGRAM DESCRIPTION... | 10:00 PROGRAM 35 PROGRAM DESCRIPTION... | | | 10:45 PROGRAM 67 PROGRAM DESCRIPTION... | | 10:00 PROGRAM 83 PROGRAM DESCRIPTION... |
| 11 | 11:00 PROGRAM 17 PROGRAM DESCRIPTION... <br> 11:45 PROGRAM 18 | 11:00 PROGRAM 27 PROGRAM DESCRIPTION... <br> 11:30 PROGRAM 28 PROGRAM DESCRIPTION... | 11:00 PROGRAM 36 PROGRAM DESCRIPTION... | 11:00 PROGRAM 46 PROGRAM DESCRIPTION... | 11:00 PROGRAM 56 PROGRAM DESCRIPTION... | | 11:00 PROGRAM 74 PROGRAM DESCRIPTION... | |

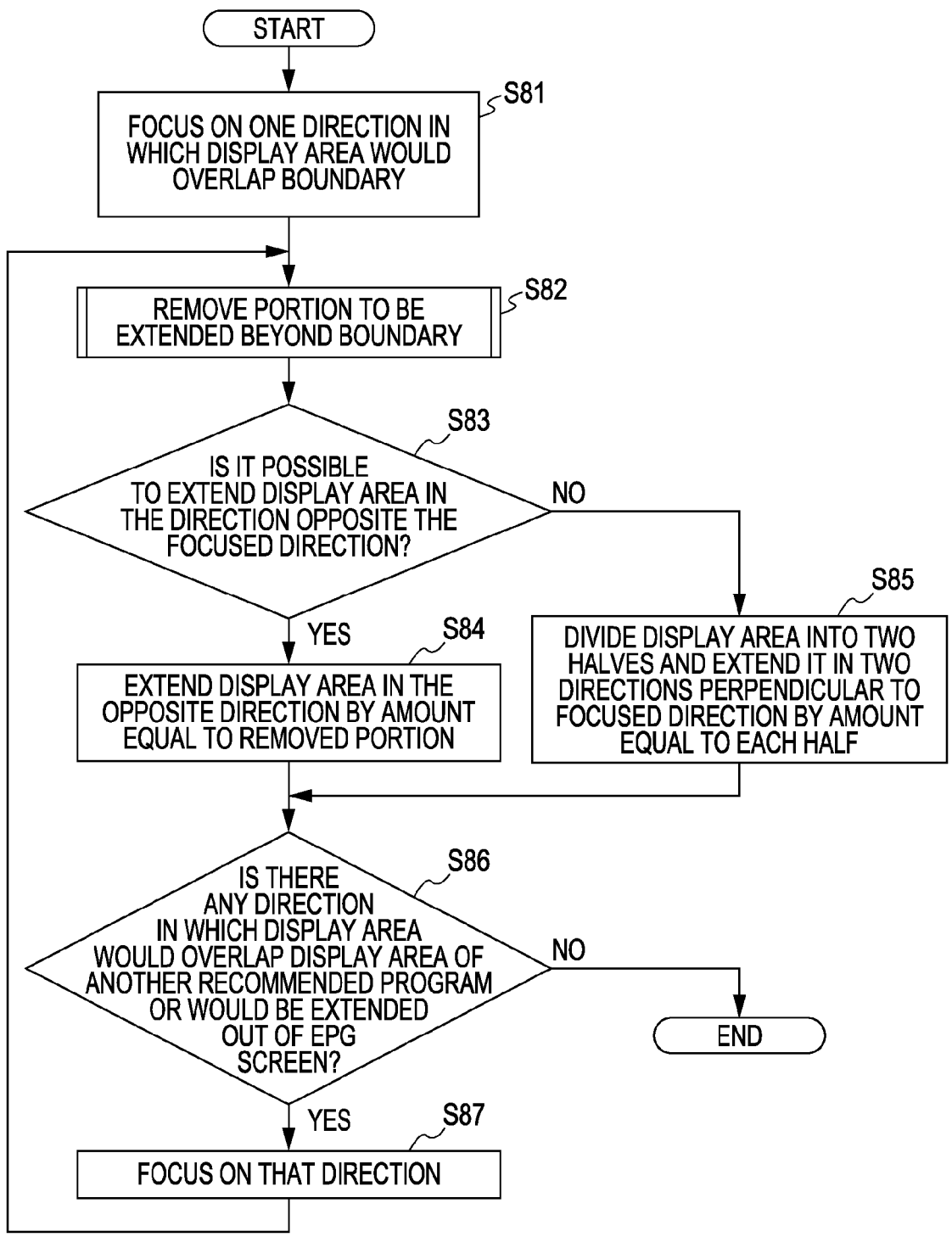

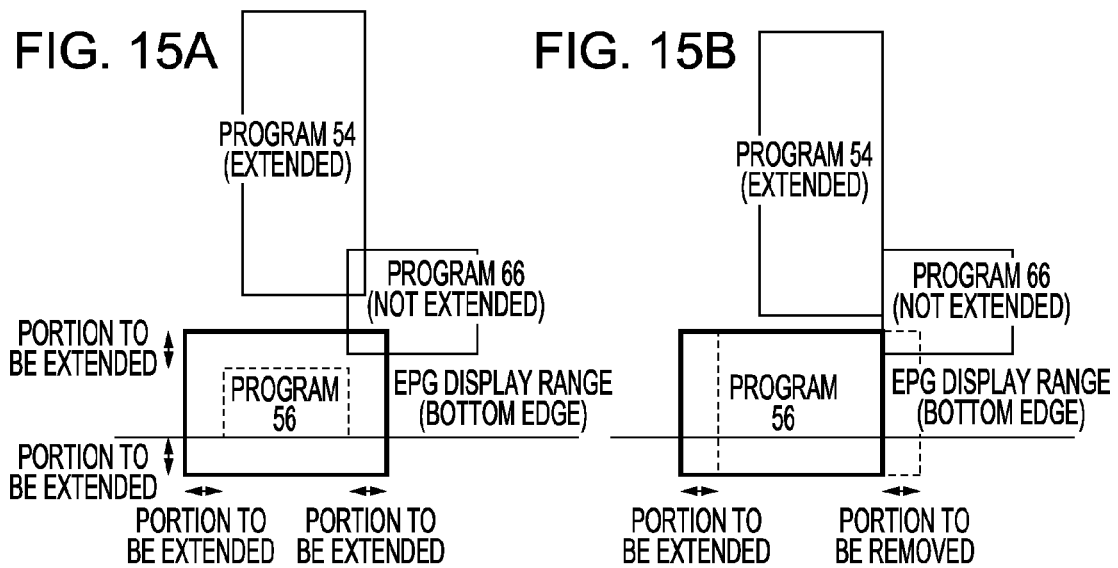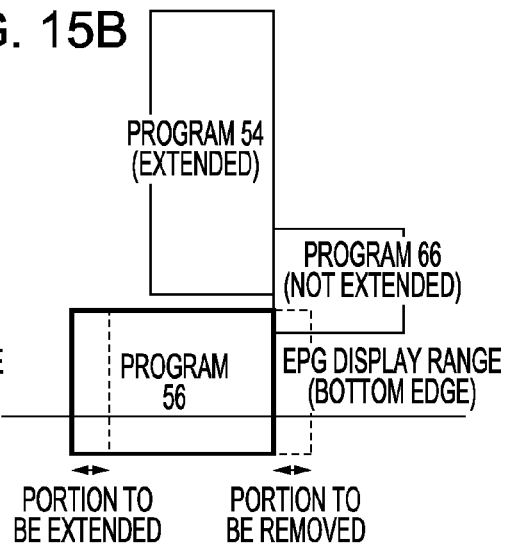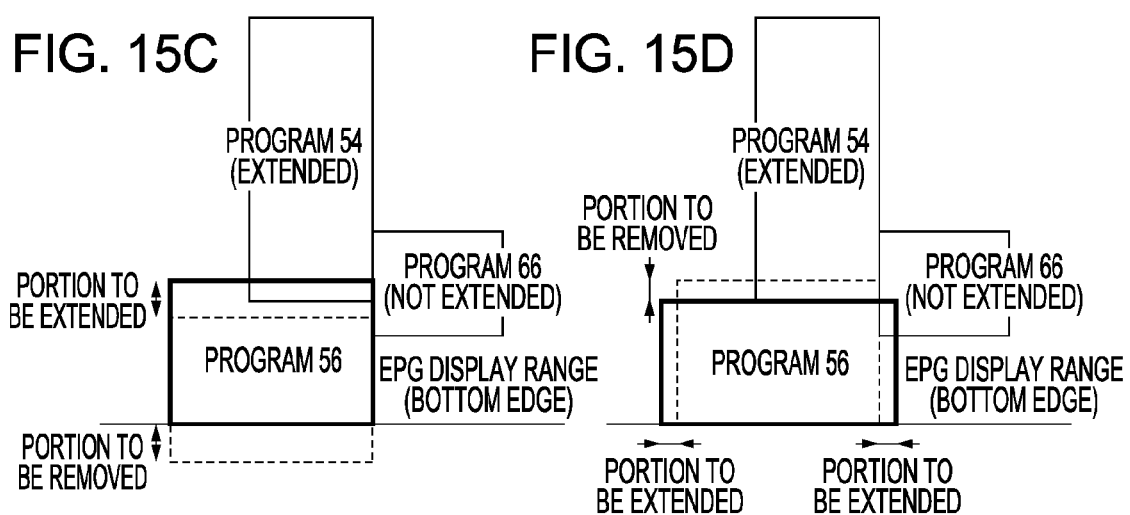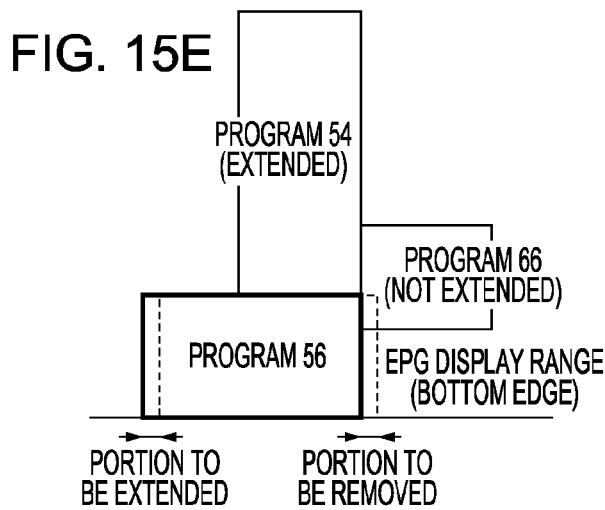

| | CH1 | CH2 | CH3 | CH4 | CH5 | CH6 | CH7 | CH8 |
|---|---|---|---|---|---|---|---|---|
| 6 | 06:00 PROGRAM 11 PROGRAM DESCRIPTION... | 06:00 PROGRAM 21 06:15 PROGRAM 22 | 06:00 PROGRAM 31 PROGRAM DESCRIPTION... 06:30 PROGRAM 32 06:45 PROGRAM 33 | 06:00 PROGRAM 41 PROGRAM DESCRIPTION... 06:30 PROGRAM 42 06:45 PROGRAM 43 | | 06:00 PROGRAM 61 PROGRAM DESCRIPTION... 06:45 PROGRAM 62 | 06:00 PROGRAM 71 PROGRAM DESCRIPTION... | 06:00 PROGRAM 81 PROGRAM DESCRIPTION... |
| 7 | 06:30 PROGR PROGRAM DESCRI 07:00 PROGR PROGRAM DESCRI 07:45 PROGR | 07:00 PROGRAM 23 PROGRAM DESCRIPTION... | PROGRAM 33 AM DESCRIPTION... | | 07:30 PROGRAM 54 PROGRAM DESCRIPTION... | | PROGRAM 72 RIPTION... | 07:00 PROGRAM 82 PROGRAM DESCRIPTION... |
| 8 | 08:00 PROGR PROGRAM DESCRI | | 08:00 PROGRAM 34 PROGRAM DESCRIPTION... | | | 08:00 PROGRAM 64 PROGRAM DESCRIPTION... | | |
| 9 | 09:30 PROGRAM 16 PROGRAM DESCRIPTION... | 09:00 PROGRAM 25 PROGRAM DESCRIPTION... | 09:00 PR PROGRAM | | 09:15 PROGRAM 66 PROGRAM DESCRIPTION... | | 09:30 PROGRAM 73 PROGRAM DESCRIPTION... | |
| 10 | | 10:30 PROGRAM 26 PROGRAM DESCRIPTION... | 10:00 PROGRAM 35 PROGRAM DESCRIPTION... | | | | | |
| 11 | 11:00 PROGRAM 17 PROGRAM DESCRIPTION... 11:45 PROGRAM 18 | 11:00 PROGRAM 27 PROGRAM DESCRIPTION... 11:30 PROGRAM 28 PROGRAM DESCRIPTION... | 11:00 PROGRAM 36 PROGRAM DESCRIPTION... | 11:00 PROGRAM 56 PROGRAM DESCRIPTION... | | | :00 PROGRAM 74 OGRAM DESCRIPTION... | |

APPARATUS FOR GENERATING ELECTRONIC PROGRAM GUIDES AND CONTROL METHOD THEREFOR

BACKGROUND OF THE INVENTION

1. Field of the Invention

The present invention relates to an apparatus for generating electronic program guides (EPGs) and a control method therefor.

2. Description of the Related Art

These days, due to the start of digital broadcasting, the widespread use of the Internet, and the integration of broadcasting and communication technologies, television viewers are using EPGs more and more often.

An EPG is a program guide (program table) including a plurality of items of program information arranged on a two-dimensional coordinate plane having coordinate axes corresponding to a first program attribute, e.g., channels, and a second program attribute, e.g., program broadcast times. By the use of an EPG, the television viewers can search for programs that they wish to watch as if they were using a newspaper television program guide.

Generally, as the number of programs arranged in an EPG is increased, the display area for each program becomes smaller, which makes it necessary to reduce the size and number of characters of program information. Accordingly, it is difficult for the viewers to recognize what kinds of programs are being displayed.

One of the functions of EPGs superior to those of newspaper television program guides is the function of highlighting information concerning recommended programs, such as programs that match users' preferences or programs that match predetermined search conditions. For example, a technique for extending display areas of recommended programs by the use of a popup function and for displaying the recommended programs in a form that can be easily recognized has been proposed. "Popup" means making display areas pop up as if they were floating on top of a screen, and "extending" means increasing the size of display areas.

Japanese Patent Laid-Open No. 2004-320503 discloses the following display method. An EPG defined by only the frame of the EPG and the partition lines between the program areas is displayed. Marks associated with programs selected under predetermined conditions are placed in the vicinities of the programs areas. More specifically, in the overview state in which program areas are displayed with a very small size without displaying information concerning the programs in the form of characters in the program areas, marks associated with programs selected under predetermined conditions are displayed near the corresponding program areas in a size larger than the program areas. If programs that match predetermined conditions are positioned close to each other, the position of the marks may be changed or the marks may be displayed by being overlapped with each other. This makes it easy to visually recognize the all of the multi-channel broadcast programs.

However, the method disclosed in Japanese Patent Laid-Open No. 2004-320503 does not take into consideration the case where many programs (recommended programs) that match predetermined conditions are positioned close to one another.

For example, in the above-described case, if the positions of the marks associated with the recommended programs are shifted so that they are not overlapped with one another, the positions of the marks may be displaced from the areas of the recommended programs by a considerable distance. This makes it difficult for the users to recognize the channels or broadcast times of the recommended programs associated with the marks.

Alternatively, as stated above, if many recommended programs are positioned close to one another, the marks associated with the recommended programs may be displayed by being overlapped with one another without shifting the positions of the marks. In this case, however, it becomes difficult to recognize marks positioned in an area underneath an area displaying program information. As stated above, instead of using marks, program information may be displayed by extending the size of the program information as a popup portion (popup window). Particularly in this case, if a plurality of items of program information are displayed by being overlapped with one another, it is more difficult for the users to recognize the characters of the program information.

Accordingly, if many recommended programs are positioned close to one another, it is necessary to consider displaying information concerning the recommended programs in a form that can be easily recognized.

SUMMARY OF THE INVENTION

An embodiment of the present invention provides an apparatus for generating electronic program guides (EPGs) and a control method therefor in which, when display areas of program information concerning a plurality of specified programs positioned close to one another are displayed as popup portions, program information desired by a user can be displayed in a form that can be easily recognized.

An embodiment of the present invention provides a control method for an apparatus for generating an EPG including: program information concerning a plurality of programs, which program information is arranged on a two-dimensional coordinate system having a coordinate axis corresponding to a first program attribute and a coordinate axis corresponding to a second program attribute. The control method includes the steps of specifying a program which meet a predetermined condition from among the plurality of programs and extending, as a popup portion, a display area of the program specified in the step of specifying. In the step of extending, when extending the display area of a first specified program as a popup portion, a configuration of the display area of the first specified program is changed so that the display area of the first specified program does not overlap a display area of a second specified program positioned close to the display area of the first specified program.

An embodiment of the present invention also provides a control method for an apparatus for generating an EPG including: program information concerning a plurality of programs, which program information is arranged on a two-dimensional coordinate system having a coordinate axis corresponding to a first program attribute and a coordinate axis corresponding to a second program attribute. The control method includes the steps of specifying a program which meet a predetermined condition from among the plurality of programs, determining a priority level for each program specified in the step of specifying on the basis of a predetermined condition, extending, as a popup portion, a display area of the program specified in the step of specifying, and controlling the display areas of the specified programs to be displayed by being overlapped with one another so that the display area of a specified program having a higher priority level determined in the step of determining is displayed on top of the display area of a specified program having a lower priority level.

In the apparatus for generating an EPG and the control method therefor according to an embodiment of the present invention, when the display areas of the program information concerning a plurality of specified programs positioned close to each other are extended as popup portions, program information desired by the users can be displayed in a form that can be easily recognized.

Further features of the present invention will become apparent from the following description of exemplary embodiments with reference to the attached drawings.

BRIEF DESCRIPTION OF THE DRAWINGS

FIG. 7 illustrates an example of a drawn EPG frame.

FIG. 8 illustrates an example of an EPG frame in which none of the display areas of program information is extended.

FIG. 14 is a flowchart illustrating processing for extending a display area in another direction by an amount equal to a removed portion.

FIGS. 15A through 15E illustrate examples of frames to explain the processing shown in FIG. 14.

FIGS. 16 and 17 are diagrams respectively illustrating first and second examples of EPG frames after performing the re-layout processing in accordance with the second embodiment of the present invention.

DESCRIPTION OF THE EMBODIMENTS

Preferred embodiments of the present invention will now be described below with reference to the attached drawings. Each embodiment described below will be helpful in understanding a variety of concepts from the generic to the more specific.

It should be noted that the technical scope of the present invention is defined by claims, and is not limited by each embodiment described below. In addition, all combinations of the features described in the embodiments are not always indispensable for the present invention.

An EPG generating apparatus in accordance with an embodiment of the present invention includes, not only an apparatus for generating and displaying EPGs, such as a television set or a personal computer, but also an apparatus for generating EPGs, such as a set-top box or a recorder. In particular, the EPG generating apparatus may preferably generate an EPG including program information arranged in a two-dimensional coordinate plane having coordinate axes corresponding to a first program attribute, e.g., channels, and a second program attribute, e.g., program broadcast times.

First Embodiment

In a first embodiment of the present invention, the EPG generating apparatus is described below in the context of a television set.

Figure 1:
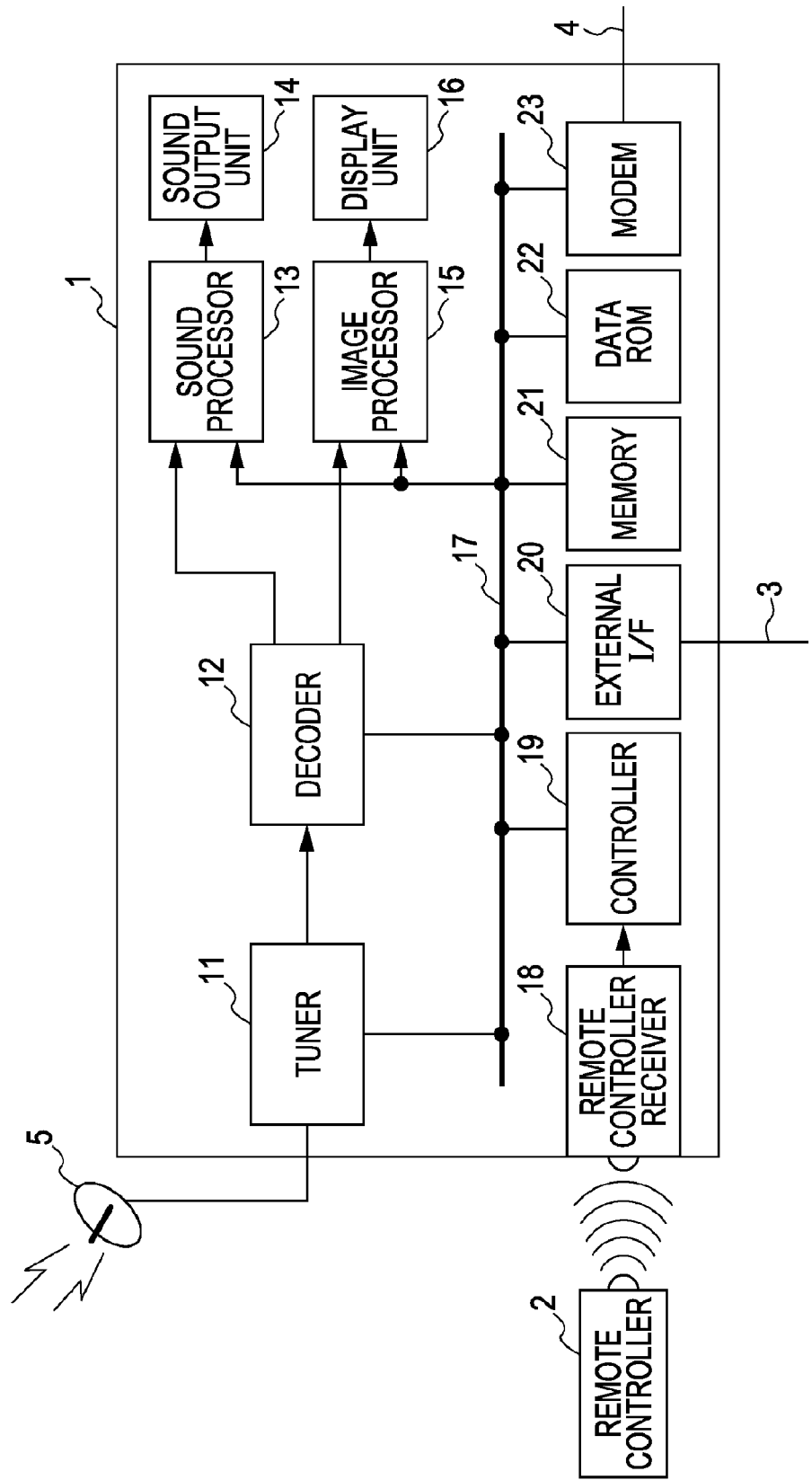
FIG. 1 is a block diagram illustrating the schematic configuration of a television set according to a first embodiment of the present invention.

FIG. 1 is a block diagram illustrating the schematic configuration of a television set 1 according to the first embodiment of the present invention. The television set shown in FIG. 1 may be operated by a television viewer by use of a remote controller. The television set 1 is connected to a network 3 and a telephone line 4 so that it can send and receive various data to and from external devices or control the external devices. An antenna 5 for receiving digital television broadcasting waves is connected to the television set 1.

The television set 1 includes a tuner 11, a decoder 12, a sound processor 13, a sound output unit 14, an image processor 15, and a display unit 16. The television set 1 also includes an internal bus 17, a remote-controller receiver 18, a controller 19, an external interface (I/F) 20, a memory 21, a data read only memory (ROM) 22, and a modem 23.

The antenna 5 receives digital television broadcasting waves transmitted from broadcast stations. The tuner 11 amplifies and demodulates a signal received by the antenna 5, selects a channel, and outputs the signal to the decoder 12.

The decoder 12 separates the signal supplied from the tuner 11 into an image signal, an audio signal, and additional data (such as data broadcasting data and EPG data), and decodes the separated signals and data. The audio signal supplied from the tuner 11 is input into the sound processor 13, the image signal is input into the image processor 15, and the additional data is supplied to the bus 17.

The sound processor 13 selects the audio signal from the decoder 12 or the audio signal input through the internal bus 17 or combines the two audio signals, and outputs the resulting signal to the sound output unit 14. The sound processor 13 also performs processing concerning the volume, sound quality, presence, etc. The sound output unit 14 is, for example, a speaker, and amplifies the sound signal from the sound processor 13 and the outputs the amplified sound signal.

The image processor 15 selects the image signal from the decoder 12 or the image signal input through the internal bus 17 or combines the two image signals, and outputs the resulting signal to the display unit 16. The display unit 16 displays the image signal processed by the image processor 15 on a screen.

The remote-controller receiver 18 receives a key-code signal from the remote controller 2 and transfers it to the controller 19. The external I/F 20 sends and receives various data, e.g., images and sound, to and from external audio-visual (AV) devices, e.g., recorders, or personal computers, via the network 3.

The memory 21 receives additional data from the decoder 12 or various data from the external I/F 20 via the internal bus 17 and stores the received data therein. In the data ROM 22, display/print character (font) data and image data concerning, for example, EPG icons and buttons, are prestored. The ROM 22 also stores programs for carrying out the display operations described below in each of the different embodiments. These display operations will be described as appropriate in connection with FIGS. 5, 10 to 14, and 18.

The modem 23 sends and receives data to and from external sources via the telephone line 4. For example, the modem 23 sends information concerning the billing for pay broadcasts to a management server, or sends and receives data when viewing interactive broadcasts, or performs Internet connection to a provider.

The internal bus 17 is connected to the tuner 11, the decoder 12, the sound processor 13, the image processor 15, the controller 19, the external I/F 20, the memory 21, the data ROM 22, and the modem 23, and allows those elements to transfer various signals and data between one another.

The controller 19 centrally controls the elements forming the television set 1 via the internal bus 17. For example, the controller 19 controls the tuner 11 to select a channel. The controller 19 also controls the sound processor 13 to select or combine sound, or controls the image processor 15 to select or combine images. The controller 19 also analyzes key-code signals received by the remote-controller receiver 18 and performs corresponding processing. The controller 19 has a time function of counting the day, month, and year, the day of the week, and the time so that it can manage information concerning the time and date and display them.

The controller 19 has a function, which serves as a specifying unit, of specifying recommended programs from a plurality of programs under predetermined conditions, and a function, which serves as an extension unit, of extending display areas of the specified recommended programs as popup portions. The controller 19 also has a function, which serves as a determination unit, of determining the priority level of the specified recommended programs on the basis of predetermined conditions, and a function, which serves as a display control unit, of controlling how to display the display areas of the recommended programs. The controller 19 also has a function, which serves as an adjusting unit, of adjusting the degree by which the display areas are extended. It is not essential, however, that the controller 19 has all the functions.

In the television set 1, detailed program information concerning individual programs contained in an EPG is received by the tuner 11 via the antenna 5. The received program information is decoded by the decoder 12 and is stored in the memory 21. In response to an instruction to display an EPG from the user by operating the remote controller 2, an EPG is formed on the basis of the program information stored in the memory 21 and is displayed on the display unit 16. A detailed operation procedure performed by the television set 1 according to the first embodiment is described below.

Figure 2:
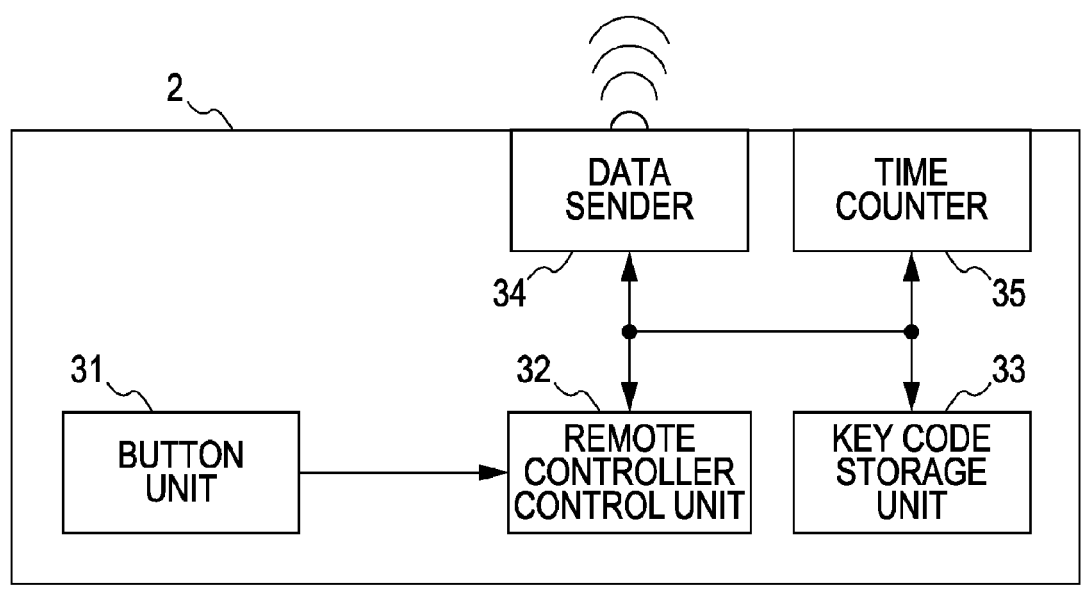
FIG. 2 is a block diagram illustrating the detailed configuration of a remote controller shown in FIG. 1.

FIG. 2 is a block diagram illustrating the detailed configuration of the remote controller 2 shown in FIG. 1. The remote controller 2 includes, as shown in FIG. 2, a button unit 31, a remote controller control unit 32, a key code storage unit 33, a data sender 34, and a time counter 35.

The user can instruct the television set 1 to perform a desired operation by pressing the buttons of the button unit 31. The key code storage unit 33 is, for example, a ROM that prestores television operating/setting key codes therein.

The data sender 34 sends various data, such as key codes, corresponding to the pressed buttons to the television set 1. The time counter 35 is used for counting the day, month, and year, the day of the week, and the time. In accordance with the pressing of the buttons of the button unit 31, the remote controller control unit 32 controls the key code storage unit 33, the data sender 34, and the time counter 35. The user can instruct the television set 1 to display an EPG by operating the remote controller 2.

Figure 3:
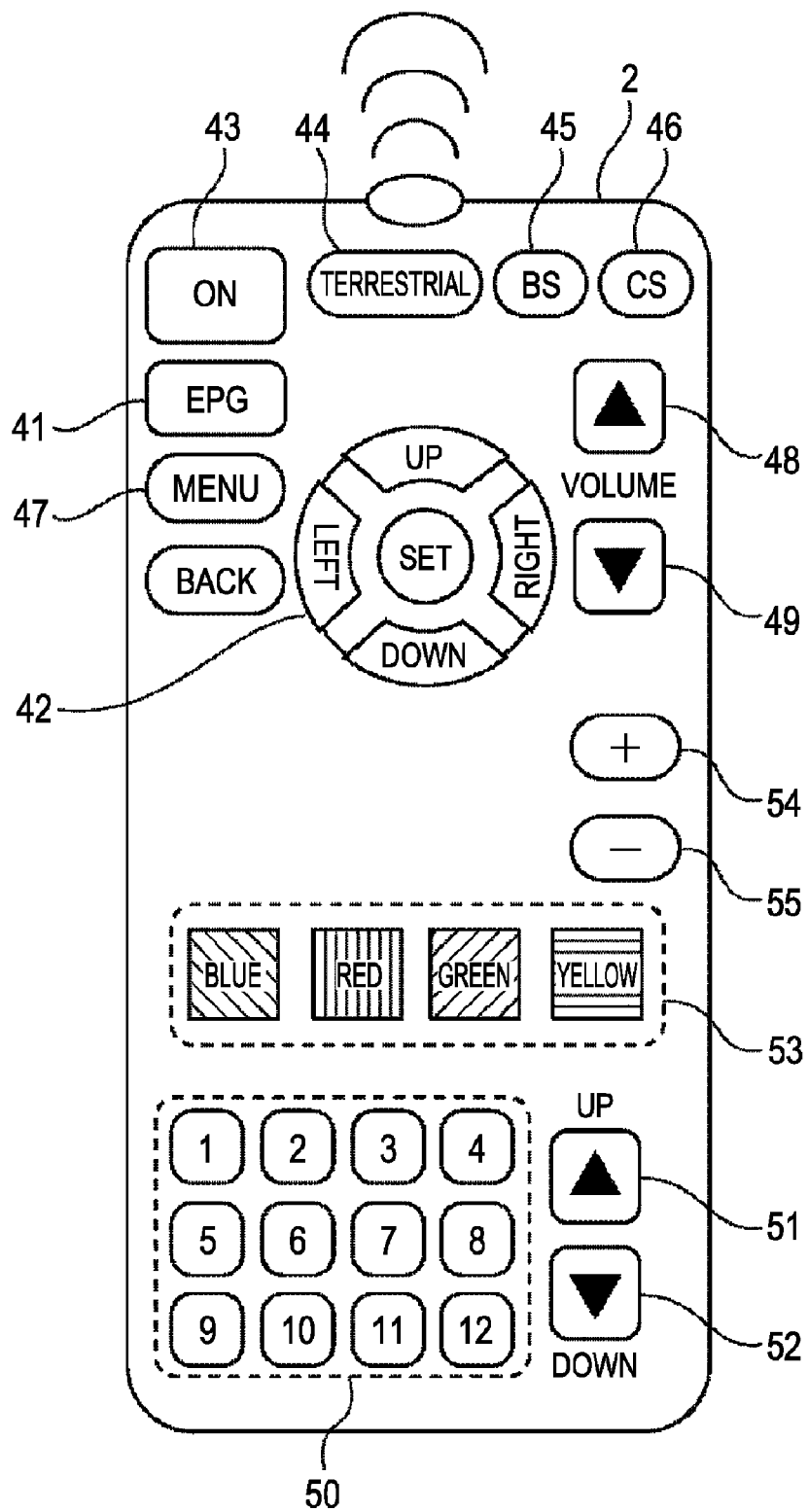
FIG. 3 is an external view illustrating the remote controller shown in FIG. 2.

FIG. 3 is an external view illustrating the remote controller 2 shown in FIG. 2. In FIG. 3, an EPG button 41 is a button for giving an instruction to display an EPG, and by pressing the EPG button 41, an EPG is displayed on the screen of the television set 1. Operation buttons 42 include up, down, left, and right cursor buttons and a setting button, and are used for performing a menu operation or an EPG operation.

A power-on button 43 is a button for turning ON/OFF the power of the main unit of the television set 1. The remote controller 2 also includes buttons 44 through 46 associated with terrestrial broadcasting, broadcasting satellite (BS) broadcasting, and communication satellite (CS) broadcasting, respectively. The remote controller 2 also includes a menu button 47 for displaying an operation menu screen and a volume UP button 48 and a volume DOWN button 49 for adjusting the volume level. Numeric buttons 50 used for selecting television channels and a channel UP button 51 and a channel DOWN button 52 used for counting up or down the television channels are also provided. Color buttons 53, such as blue, red, green, and yellow buttons, used for a data broadcasting screen and EPGs are also provided. The remote controller 2 also includes a plus button 54 and a minus button 55 for adjusting the degree by which a display area of program information is extended, which serves as buttons unique to the first embodiment of the present invention.

Figure 4:
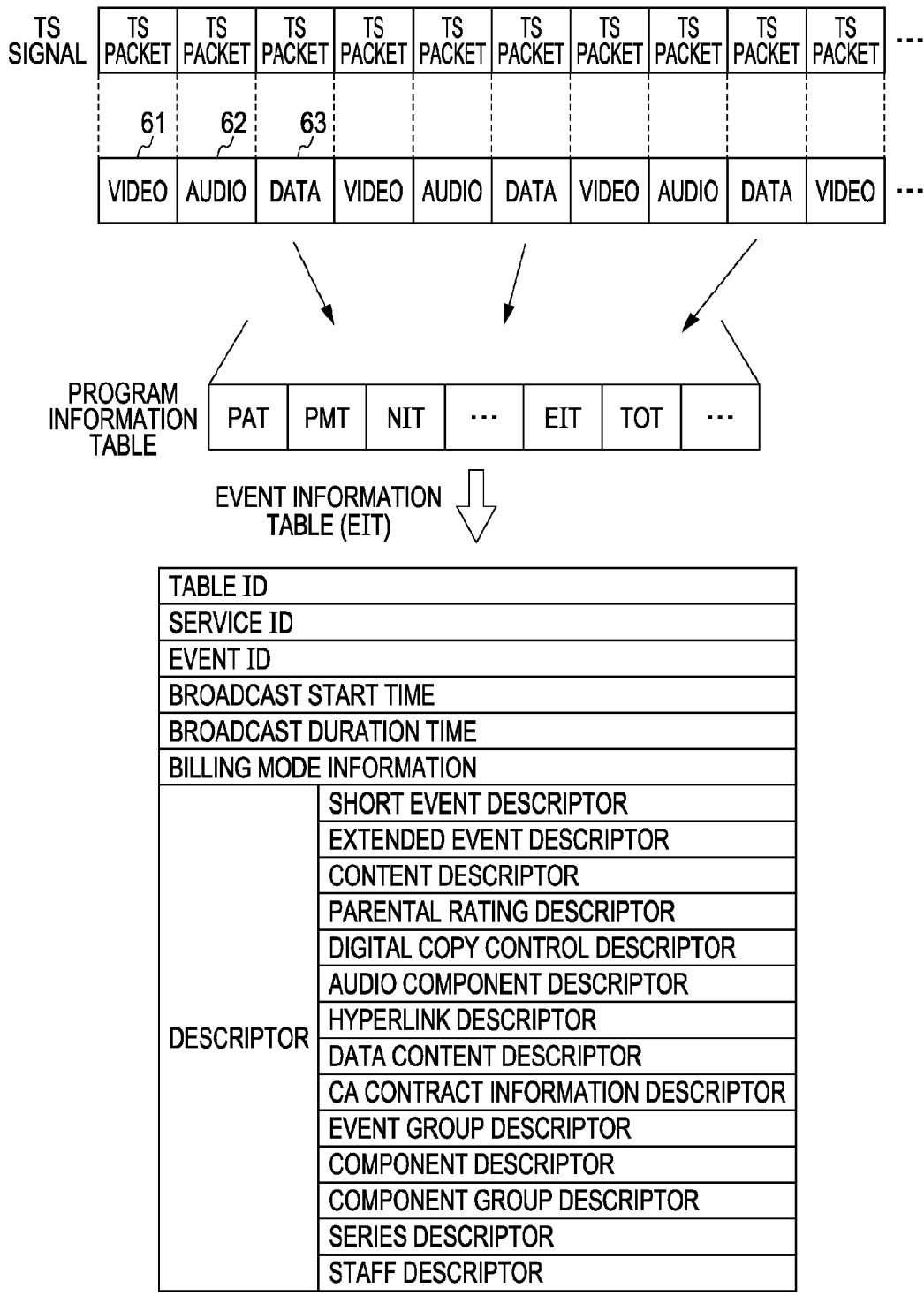
FIG. 4 illustrates an example of the configuration of EPG data carried on digital television broadcasting waves.

FIG. 4 illustrates an example of the configuration of EPG data carried on digital television broadcasting waves. Digitized broadcasting signals are defined by various standardization groups, such as the International Electrotechnical Commission (IEC), the Institute of Electrical and Electronics Engineers (IEEE), the Association of Radio Industries and Businesses (ARIB), and are transmitted, as shown in FIG. 4, in units of packets which are referred to as "transport stream (TS) packets".

A TS signal includes video portions 61 corresponding to an image signal, audio portions 62 corresponding to an audio signal, and data portions 63 associated with additional data. A plurality of data portions 63 are collected and reformed into a program information table. The program information table includes various tables related to information unique to broadcast programs, such as a program association table (PAT), a program map table (PMT), a network information table (NIT), an event information table (EIT), a time offset table (TOT), etc. The EPG data is formed of several items and descriptors in the EIT. At the start of the EIT, the table ID, the service ID, and the event ID are indicated, followed by the program broadcast start time, the program broadcast duration, and the billing mode information. After those items, several descriptors are indicated. Among them, descriptors related to an EPG are discussed below.

The short event descriptor is a descriptor indicating the title or subtitle of a program, and the extended event descriptor is a descriptor indicating characters' names, such as casts, playwright, and host, and a program description. The content descriptor is a descriptor representing the category of a broadcast program. The categories of broadcast programs are defined by the major categories, such as "news/report", "sport", "dramas", "movies", "variety", and "documentary/education", and by detailed intermediate categories associated with each major category, such as "football", "baseball", and "Olympic/Worlds" in "sport".

The parental rating descriptor is a descriptor representing the parental lock. The digital copy control descriptor is a descriptor designating information concerning restrictions on digital/analog copy. The data content descriptor is a descriptor indicating information concerning program-related data broadcasting. The CA contract information descriptor is a descriptor representing information whether or not viewing or reserve-recording for pay programs is permitted. The event group descriptor is a descriptor representing event sharing/grouping information or link information concerning event relay. The component descriptor is a descriptor indicating information concerning a combination of components within an event in a multi-view television. The series descriptor is a descriptor representing information concerning series programs or rebroadcast programs.

As discussed above, in the television set 1 according to the first embodiment of the present invention, additional data carried on digital television broadcasting waves is supplied to the internal bus 17 via the antenna 5, the tuner 11, and the decoder 12. The controller 19 reconstructs the EIT by the use of the additional data supplied to the internal bus 17, and stores data having the above-described format in the memory 21 as EPG data. Then, in response to an instruction from a television viewer, the controller 19 reads out the EPG data from the memory 21 to generate an EPG frame by the use of image data, such as EPG icons and buttons, stored in the data ROM 22, and displays the EPG frame on the display unit 16 via the image processor 15.

Figure 5:
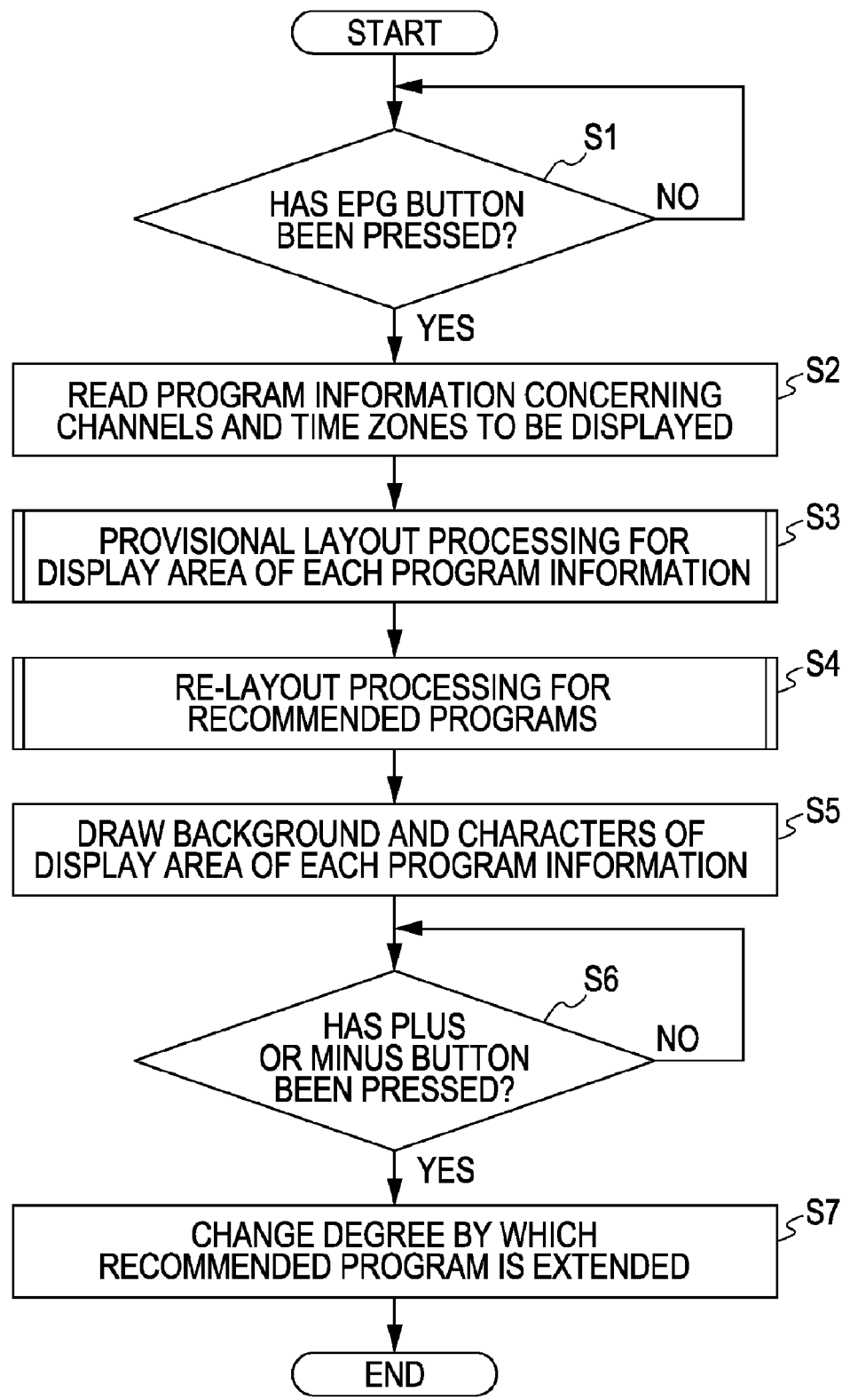
FIG. 5 is a flowchart illustrating processing for displaying an EPG performed by the television set shown in FIG. 1.

The operation of the television set 1 configured as described above according to the first embodiment of the present invention is described below with reference to the flowchart in FIG. 5. FIG. 5 is a flowchart illustrating EPG displaying processing performed by the television set 1 shown in FIG. 1.

Before this processing, EPG data is extracted from broadcasting waves and is stored in the memory 21 when the television set 1 is powered ON.

When the television viewer wishes to view an EPG while watching a television broadcast, he/she presses the EPG button 41 of the remote controller 2. In step S1, it is determined whether the EPG button 41 has been pressed. If it is determined that the EPG button 41 has been pressed, the data sender 34 of the remote controller 2 sends a key-code signal, and the remote-controller receiver 18 of the television set 1 receives the key-code signal. The controller 19 of the television set 1 then detects that the EPG button 41 of the remote controller 2 has been pressed.

If it is determined in step S1 that the EPG button 41 has not been pressed, the process repeats step S1 until the EPG button 41 has been pressed.

In step S2, the controller 19 reads out program information concerning programs for channels, e.g., eight channels, and time zones, e.g., six hours, to be displayed from the memory 21.

Figure 6:
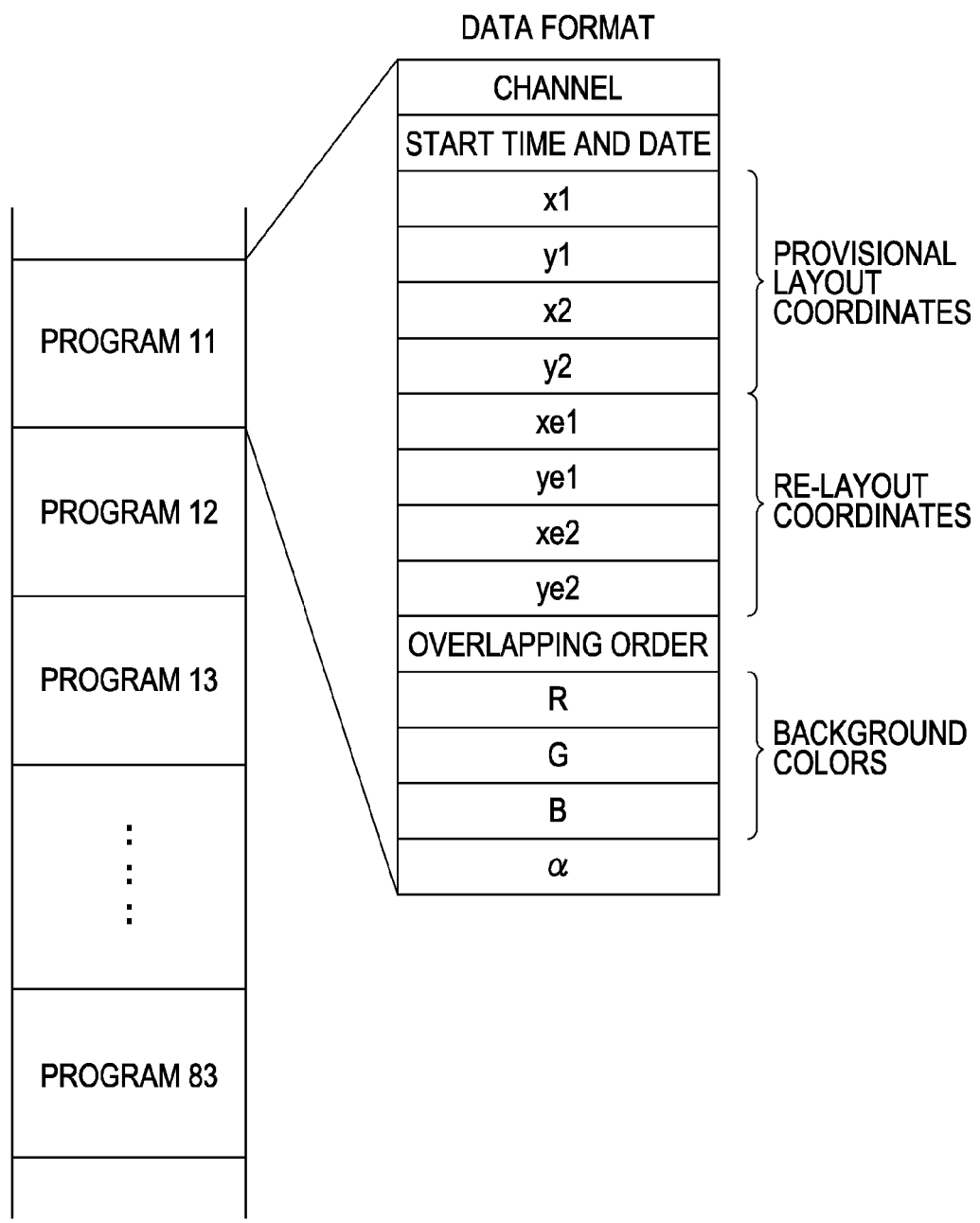
FIG. 6 illustrates the data format of layout data concerning the display area of each item of program information.

Then, in step S3, the controller 19 performs provisional layout processing for all programs to be displayed in an EPG. In the provisional layout processing, the size (vertical height and horizontal length) and position of a display area of each item of program information on a two-dimensional coordinate system including channels as a horizontal axis and time zones as a vertical axis are provisionally determined. In the provisional layout processing, the horizontal lengths of the display areas of the program information are equal to one another, and the heights of the display areas are proportional to the program durations. The coordinates of the display area of each item of program information are stored in the memory 21 in the data format (x1, y1, x2, y2) shown in FIG. 6. FIG. 6 illustrates the data format of the layout data concerning the display area of each item of program information. At the stage of the provisional layout processing, characters and background colors are not yet drawn. Details of the provisional layout processing are given below.

In step S4, the controller 19 performs re-layout processing. In the re-layout processing, the sizes and positions of the display areas subjected to the provisional layout processing are changed. More specifically, the display areas of recommended programs are extended as popup portions (popup windows). The recommended programs are programs extracted on the basis of user's preferences or programs that match search conditions by the use of a keyword. The coordinates of the display area of each item of program information after the re-layout processing are stored in the memory 21 in the data format (xe1, ye1, xe2, ye2) shown in FIG. 6. At the stage of the re-layout processing, characters and background colors are not yet drawn. Details of the re-layout processing (including an operation for determining recommended programs) are given below.

Then, in step S5, a background and characters of the display area of each item of program information are drawn. In this case, after drawing backgrounds and characters of the display areas of the program information concerning broadcasts other than recommended programs, background and characters of the display areas of the program information concerning recommended programs are drawn so that they can be displayed in an area on top of the display areas of the other programs. In the display area of each item of program information, the program start time, the program title (program name and subtitle), the program description (characters' names and program description), etc., are drawn. If the number of characters exceeds a predetermined number, a maximum number of characters that can be displayed in a display area are drawn. Different colors are provided for backgrounds of the display areas of program information according to the categories. The display areas after being extended are distinguished from the display areas before being extended with different colors so that the channels, program start times, and program end times can be recognized correctly.

FIG. 7 illustrates an example of an EPG frame drawn in step S5. In FIG. 7, the downward-sloping hatched pattern is a light-blue color background and represents the category "journey variety". The vertically hatched pattern is a light-red color background and represents the category "history/travel". The upward-sloping hatched portion is a light-green color background and indicates the category "culture/tradition". The horizontally hatched portion is a light-yellow background and designates the category "journey/fishing/outdoor". FIG. 7 shows that, for example, the program 23 has a background represented by a downward-sloping pattern (light-blue background) and is a program of channel (CH) 2 in a time zone from 7:00 to 8:00.

Referring back to FIG. 5, it is determined in step S6 whether the plus button 54 or the minus button 55 has been pressed. If it is determined in step S6 that the plus button 54 or the minus button 55 has been pressed, the process proceeds to step S7. In step S7, the degree by which the display area of the program information concerning a recommended program is extended is changed. If the plus button 54 has been pressed, the degree by which the display area of the recommended program is extended is increased. If the minus button 55 has been pressed, the degree by which the display area of the recommended program is extended is decreased. In accordance with the pressing of the plus button 54 or the minus button 55, the program information concerning the recommended program can be displayed in greater detail, or information concerning another program hidden behind the recommended program can be displayed.

If the user continues to press the minus button 55, or if recommended programs do not exist, the display areas of program information concerning all programs are not extended. FIG. 8 illustrates an example of an EPG frame in which the display areas of program information concerning all programs have not been extended.

In the EPG frame shown in FIG. 7, if, among the color buttons 53 of the remote controller 2, a button assigned to program search, e.g., a green button, is pressed, a frame for specifying search conditions is displayed. If a category or a keyword is specified in this frame, the re-layout processing is performed in step S4 so that, regardless of categories or keywords registered before, the display areas of the program information concerning recommended programs that match the specified search conditions are extended as popup windows.

Details of the provisional layout processing in step S3 shown in FIG. 5 are discussed below. The provisional layout processing is controlled by the controller 19 shown in FIG. 1. A coordinate system of the EPG frame is first discussed with reference to FIG. 9. In the provisional layout processing, coordinates at the four corners of a display area of program information concerning each program on the EPG frame are provisionally determined. The coordinates at the top left corner are set to be $(x1(N), y1(N))$, the coordinates at the bottom left corner are set to be $(x1(N), y2(N))$, the coordinates of the top right corner are set to be $(x2(N), y1(N))$, and the coordinates of the bottom right corner are set to be $(x2(N), y2(N))$.

For example, in the EPG frame shown in FIG. 8, the coordinates of the top left corner, the bottom left corner, the top right corner, and the bottom right corner of the display areas of program information concerning all the programs in the channels CH1 through CH8 in time zones from 6:00 to 12:00 can be determined. In the provisional layout processing, the horizontal lengths of the display areas of the program information are equal to one another, and the x coordinate $x1(i)$ at the left edge of the display area of the i-th channel coincides with the x coordinate $x2(i-1)$ at the right edge of the display area of the (i-1)-th channel.

Figure 9:
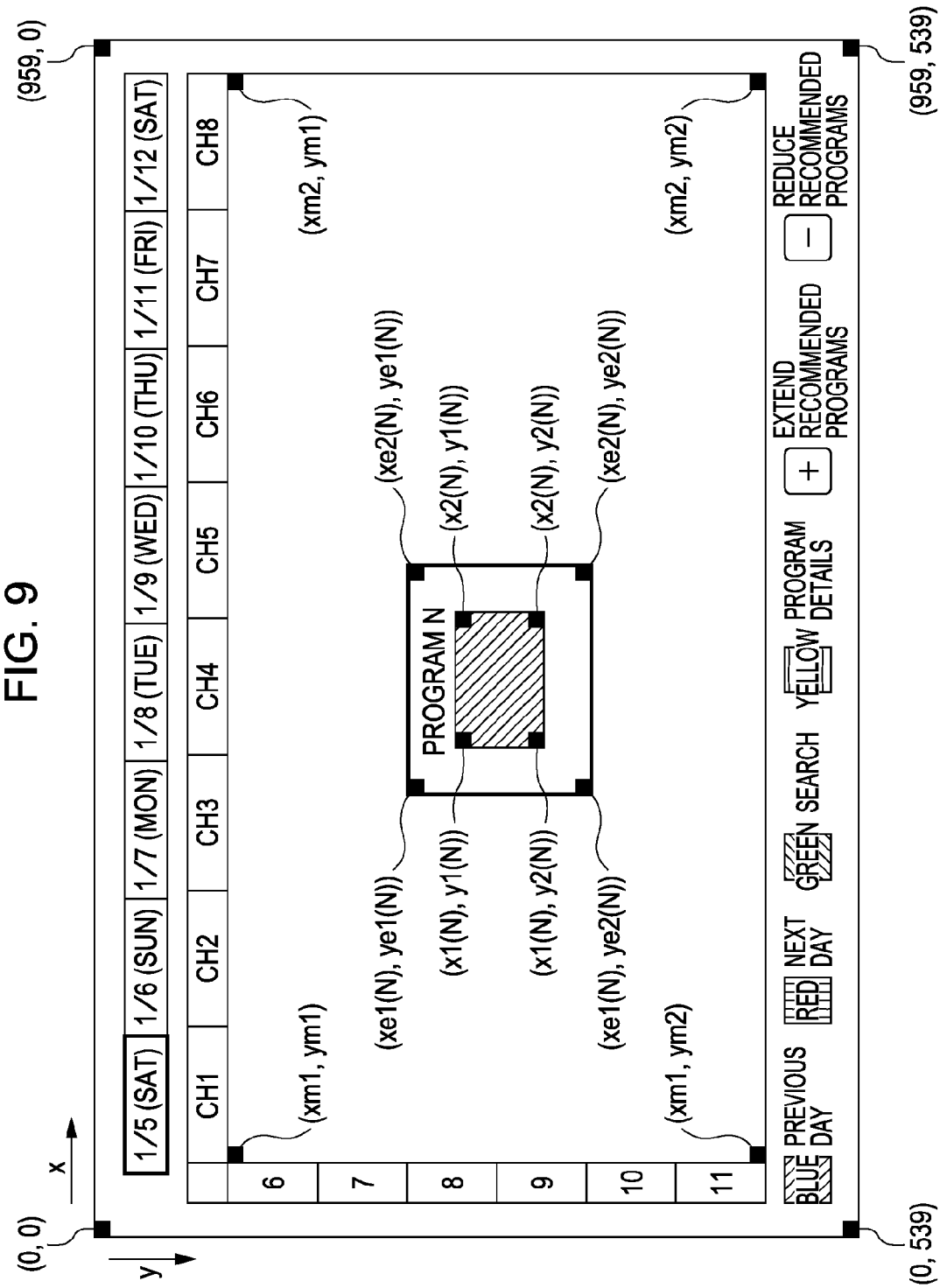
FIG. 9 illustrates a coordinate system of an EPG frame.

Details of the re-layout processing in step S4 shown in FIG. 5 are described below. In the re-layout processing, coordinates at the four corners after extending the display area of program information concerning a program are determined. The coordinates of the top left corner, the bottom left corner, the top right corner, and the bottom right corner of the extended display area of program information concerning a program N are set to be $(xe1(N), ye1(N))$, $(xe1(N), ye2(N))$, $(xe2(N), ye1(N))$, and $(xe2(N), ye2(N))$, respectively, as shown in FIG. 9.

The re-layout processing is described below with reference to FIG. 9 and the flowchart in FIG. 10. The re-layout processing is controlled by the controller 19 shown in FIG. 1.

In step S21, the channel displayed at the leftmost column on the EPG frame is focused. Then, in step S22, in the focused channel, the program positioned at the topmost row is focused. That is, the program whose top left corner of the display area of the program information is positioned at the coordinates $(xm1, ym1)$ shown in FIG. 9 is focused.

Then, in step S23, it is determined whether the focused program is a recommended program. The recommended program is a program of a category registered by the user or a program containing a keyword registered by the user in a program title or a program description. Alternatively, programs having attributes similar to those of programs viewed or recorded in the past, or programs that match search conditions, such as categories or keywords, specified on the EPG frame displayed on the display unit may be set to be recommended programs.

If it is determined in step S23 that the focused program is a recommended program, the process proceeds to step S24. In step S24, the display area of program information concerning the focused program is extended. More specifically, the coordinates at each of the four corners determined in the provisional layout processing are changed by an amount equal to a predetermined amount. That is, concerning the display area of the recommended program N, the x coordinate $x1(N)$ at the left edge of the display area is shifted to the left by an amount equal to n characters, the x coordinate $x2(N)$ at the right edge is shifted to the right by an amount equal to n characters, the y coordinate $y1(N)$ of the top edge is shifted toward the top by an amount equal to n characters, and the y coordinate $y2(N)$ at the bottom edge is shifted toward the bottom by an amount equal to n characters. The amount by which each coordinate is shifted results in the value obtained by multiplying the value n by the font size. If the font size (two bytes) is f×f pixels, the x coordinate at the left edge of the display area of the program information concerning the recommended program N after being extended results in $xe1(N)=x1(N)-f×n$, the x coordinate at the right edge thereof results in $xe2(N)=x2(N)+f×n$, the y coordinate at the top edge thereof results in $ye1(N)=y1(N)-f×n$, and the y coordinate at the bottom edge thereof results in $ye2(N)=y2(N)+f×n$. The value n can be increased or decreased by pressing the plus button 54 or the minus button 55, respectively, of the remote controller 2 (steps S6 and S7 in FIG. 5).

If it is determined in step S23 that the focused program is not a recommended program, the process proceeds to step S27. In this case, the coordinates of the four corners of the display area of the program information concerning the program remain as the coordinates determined in the provisional layout processing. That is, the x coordinate at the left edge of the display area of the recommended program N results in $x1(N)$, i.e., $xe1(N)=x1(N)$, the x coordinate at the right edge thereof results in $x2(N)$, i.e., $xe2(N)=x2(N)$, the y coordinate at the top edge thereof results in $y1(N)$, i.e., $ye1(N)=y1(N)$, and the y coordinate at the bottom edge thereof results in $y2(N)$, i.e., $ye2(N)=y2(N)$.

It is then determined in step S25 whether, as a result of the extension processing, the extended display area of the program information concerning the recommended program would overlap the display area of program information concerning another program or would be extended out of the display area of the EPG frame. If it is determined in step S25 that the display area would overlap the display area of another program or would be extended out of the EPG frame, the process proceeds to step S26. In step S26, the portion to be extended beyond the boundary with the display area of program information concerning another recommended program or with the display range of the EPG frame is removed. That is, the x coordinates $xe1(N)$ and $xe2(N)$ and the y coordinates $ye1(N)$ and $ye2(N)$ of the display area of the program information concerning the recommended program N are changed. Details of this processing are discussed below.

It is then determined in step S27 whether the focused program is the program positioned at the bottommost row of the EPG frame. More specifically, it is determined in step S27 whether the y coordinate at the bottom edge of the display area of the program information concerning the focused program is ym2 (see FIG. 9). If it is determined in step S27 that the focused program is not the program positioned at the bottommost row of the EPG frame, the process proceeds to step S28. In step S28, the program positioned in one row below is focused, and the process returns to step S23. In this manner, steps S23 through S28 are repeated sequentially for the programs from the topmost row to the bottommost row.

If it is determined in step S27 that the focused program is the program positioned at the bottommost row of the EPG frame, the process proceeds to step S29 to determine whether the focused channel is the channel positioned at the rightmost column of the EPG frame. More specifically, it is determined whether the x coordinate at the right edge of the display area of the program information concerning the focused program is xm2 (see FIG. 9). If it is determined in step S29 that the focused channel is not the channel positioned at the rightmost column, the process proceeds to step S30. In step S30, the channel positioned in one column to the right is focused, and the process returns to step S22. In this manner, steps S22 through S30 are repeated sequentially for the channels from the leftmost column to the rightmost column of the EPG frame. If it is determined in step S29 that the focused channel is the channel positioned at the rightmost column, the re-layout processing is completed.

Details of the processing in step S25 for determining whether the display area of the program information concerning the focused program would overlap the display area of the program information concerning another recommended program are discussed below.

Figure 11:
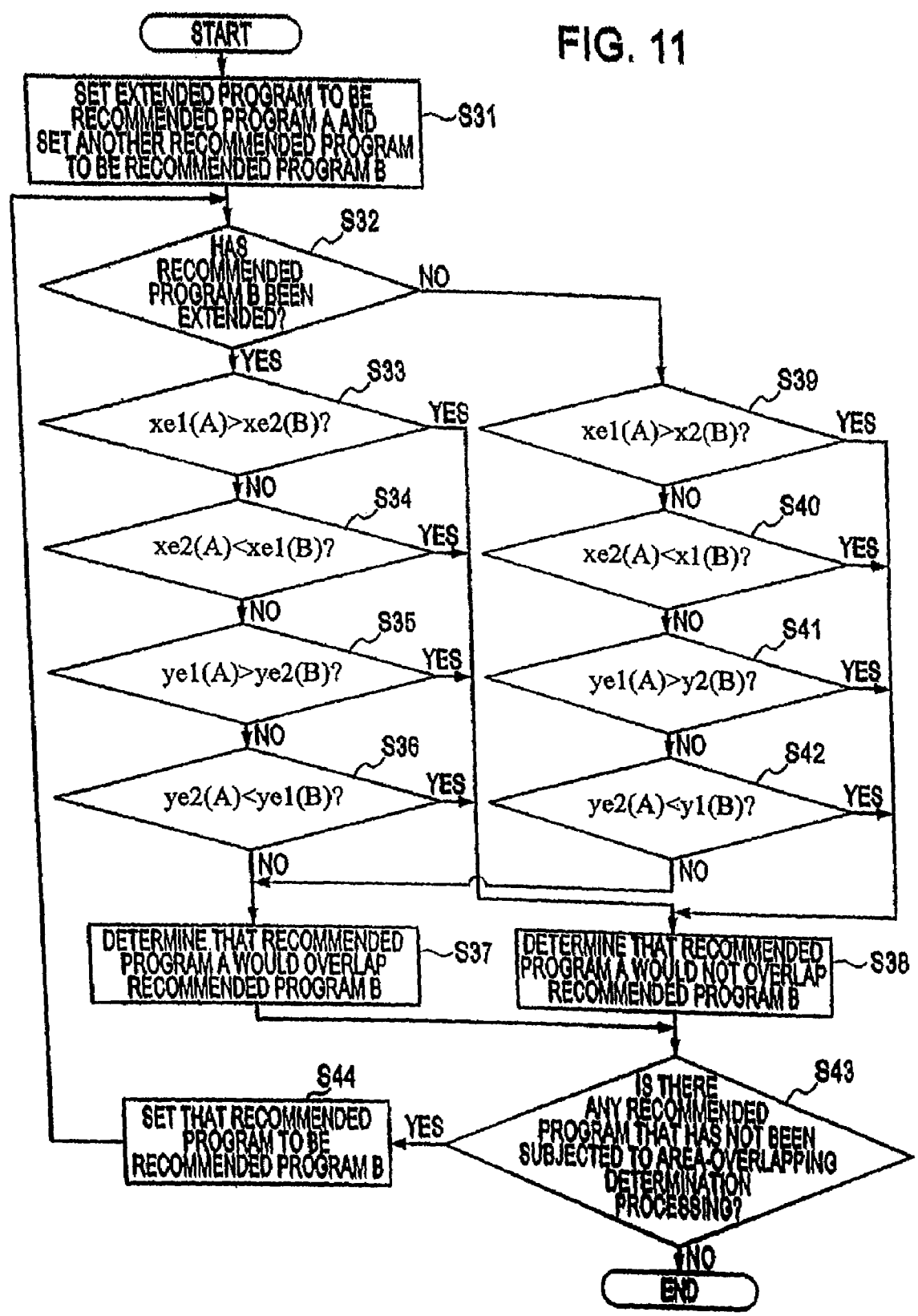
FIG. 11 is a flowchart illustrating area-overlapping determination processing.

FIG. 11 is a flowchart illustrating area-overlapping determination processing. In step S31, a recommended program having an extended display area is set to be recommended program A, and another recommended program is set to be recommended program B.

Then, in step S32, it is determined whether the display area of the recommended program B has been extended. If it is determined that the display area of the recommended program B has been extended, the process proceeds to step S33 to determine whether the x coordinate $xe1(A)$ at the left edge of the display area of the program information concerning the recommended program A is positioned farther toward the right than the x coordinate $xe2(B)$ at the right edge of the display area of the program information concerning the recommended program B. If it is determined in step S33 that the x coordinate $xe1(A)$ meet the condition expression described above, i.e., $xe1(A)>xe2(B)$, the process proceeds to step S38 to determine that the display area of the program information concerning the recommended program A would not overlap the display area of the program information concerning the recommended program B. In contrast, if it is determined in step S33 that the x coordinate $xe1(A)$ does not meet the condition expression described above, i.e., $xe1(A)\leq xe2(B)$, the process proceeds to step S34. In step S34, it is determined whether the x coordinate $xe2(A)$ at the right edge of the display area of the program information concerning the recommended program A is positioned farther toward the left than the x coordinate $xe1(B)$ at the left edge of the display area of the program information concerning the recommended program B. If it is determined in step S34 that the x coordinate $xe2(A)$ meet the condition expression described above, i.e., $xe2(A)<xe1(B)$, the process proceeds to step S38 to determine that the display area of the program information concerning the recommended program A would not overlap the display area of the program information concerning the recommended program B. In contrast, if it is determined in step S34 that the x coordinate $xe1(A)$ $xe2(A)$ does not meet the condition expression described above, i.e., $xe2(A)\geq xe1(B)$, the process proceeds to step S35.

It is determined in step S35 whether the y coordinate $ye1(A)$ at the top edge of the display area of the program information concerning the recommended program A is positioned farther toward the bottom than the y coordinate $ye2(B)$ at the bottom edge of the display area of the program information concerning the recommended program B. If it is determined in step S35 that the coordinate $ye1(A)$ meet the condition expression described above, i.e., $ye1(A)>ye2(B)$, the process proceeds to step S38 to determine that the display area of the program information concerning the recommended program A would not overlap the display area of the program information concerning the recommended program B. In contrast, if it is determined in step S35 that the coordinate $ye1(A)$ does not meet the condition expression described above, i.e., $ye1(A)\leq ye2(B)$, the process proceeds to step S36. In step S36, it is determined whether the y coordinate $ye2(A)$ at the bottom edge of the display area of the program information concerning the recommended program A is positioned farther toward the top than the y coordinate $ye1(B)$ at the top edge of the display area of the program information concerning the recommended program B. If it is determined in step S36 that the coordinate $ye2(A)$ meet the condition expression described above, i.e., $ye2(A)<ye1(B)$, the process proceeds to step S38 to determine that the display area of the program information concerning the recommended program A would not overlap the display area of the program information concerning the recommended program B. In contrast, if it is determined in step S36 that the y coordinate $ye2(A)$ does not meet the condition expression described above, i.e., $ye2(A)\geq ye1(B)$), the process proceeds to step S37.

If it is determined in step S32 that the display area of the program information concerning the recommended program B has not been extended, the process proceeds to step S39 to determine whether the x coordinate $xe1(A)$ at the left edge of the display area of the program information concerning the recommended program A is positioned farther toward the right than the x coordinate $x2(B)$ at the right edge of the display area of the program information concerning the recommended program B. If it is determined in step S39 that the x coordinate $xe1(A)$ meet the condition expression described above, i.e., $xe1(A)>x2(B)$, the process proceeds to step S38 to determine that the display area of the program information concerning the recommended program A would not overlap the display area of the program information concerning the recommended program B. In contrast, if it is determined in step S39 that the x coordinate $xe1(A)$ does not meet the condition expression described above, i.e., $xe1(A)\leq x2(B)$, the process proceeds to step S40. In step S40, it is determined whether the x coordinate $xe2(A)$ at the right edge of the display area of the program information concerning the recommended program A is positioned farther toward the left than the x coordinate $x1(B)$ at the left edge of the display area of the program information concerning the recommended program B. If it is determined in step S40 that the x coordinate $xe2(A)$ meet the condition expression described above, i.e., $xe2(A)<x1(B)$, the process proceeds to step S38 to determine that the display area of the program information concerning the recommended program A would not overlap the display area of the program information concerning the recommended program B. In contrast, if it is determined in step S40 that the x coordinate $xe2(A)$ does not meet the condition expression described above, i.e., $xe2(A)\geq x1(B)$, the process proceeds to step S41.

It is determined in step S41 whether the y coordinate $ye1(A)$ at the top edge of the display area of the program information concerning the recommended program A is positioned farther toward the bottom than the y coordinate $y2(B)$ at the bottom edge of the display area of the program information concerning the recommended program B. If it is determined in step S41 that the y coordinate $ye1(A)$ meet the condition expression described above, i.e., ye1(A)>y2(B), the process proceeds to step S38 to determine that the display area of the program information concerning the recommended program A would not overlap the display area of the program information concerning the recommended program B. In contrast, if it is determined in step S41 that the coordinate ye1(A) does not meet the condition expression described above, i.e., ye1(A)≦y2(B), the process proceeds to step S42. In step S42, it is determined whether the y coordinate ye2(A) at the bottom edge of the display area of the program information concerning the recommended program A is positioned farther toward the top than the y coordinate y1(B) at the top edge of the display area of the program information concerning the recommended program B. If it is determined in step S42 that the y coordinate ye2(A) meet the condition expression described above, i.e., ye2(A)<y1(B), the process proceeds to step S38 to determine that the display area of the program information concerning the recommended program A would not overlap the display area of the program information concerning the recommended program B. In contrast, if it is determined in step S42 that the y coordinate ye2(A) does not meet the condition expression described above, i.e., ye2(A)≧y1(B), the process proceeds to step S37.

In step S37, it is determined that the display area of the program information concerning the recommended program A would overlap the display area of the program information concerning the recommended program B, and then, the process proceeds to step S43. After it is determined in step S38 that the display area of the program information concerning the recommended program A would not overlap the display area of the program information concerning the recommended program B, the process also proceeds to step S43. In step S43, it is determined whether there is any recommended program that has not been subjected to area-overlapping determination processing with the recommended program A. If such a program is found in step S43, the process proceeds to step S44 in which the recommended program is set to be the recommended program B. Then, the process returns to step S32 and repeats steps S32 through S43. If it is determined in step S43 that all the recommended programs have been subjected to area-overlapping determination processing, the area-overlapping determination processing is completed.

Figure 10:
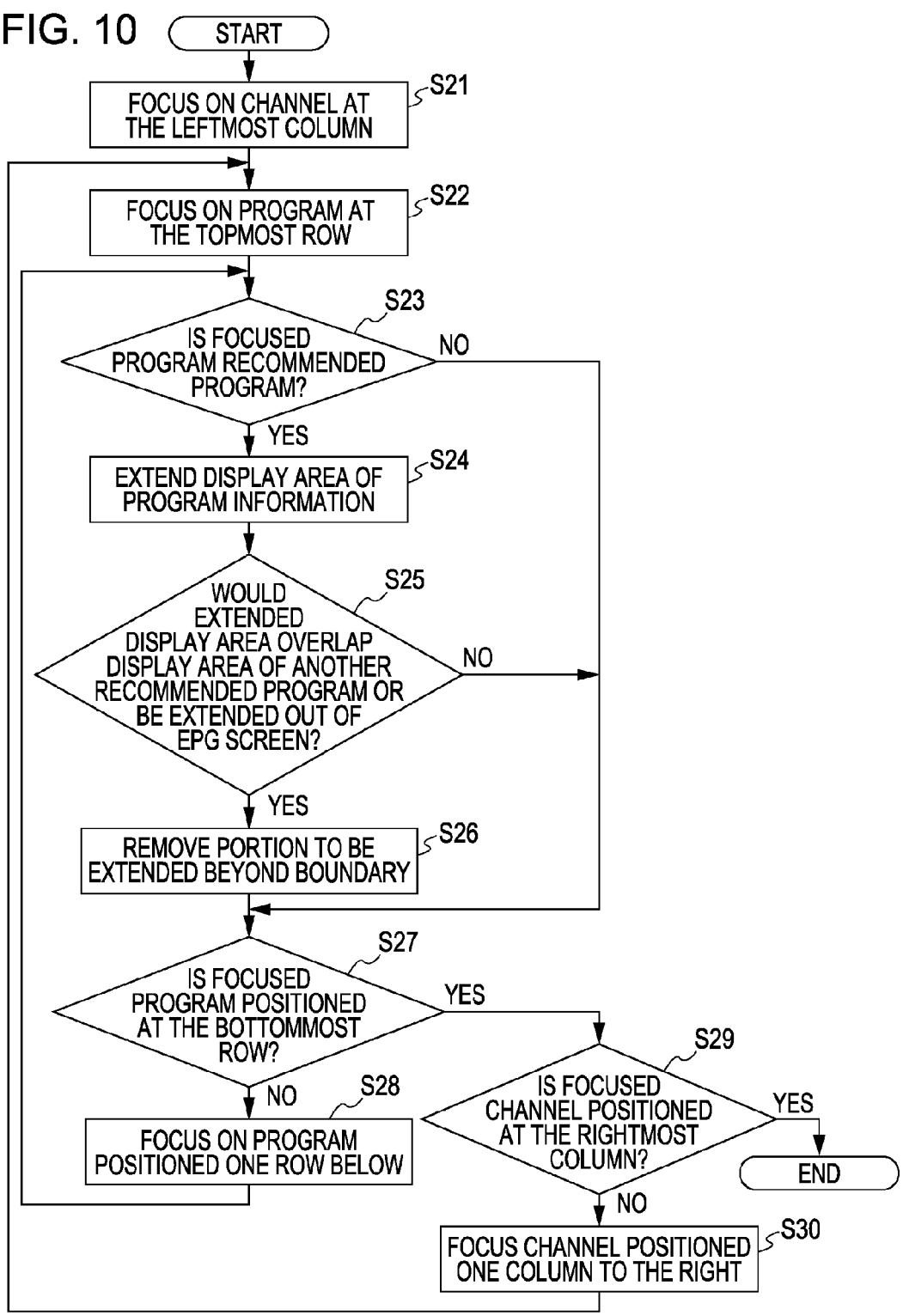
FIG. 10 is a flowchart illustrating re-layout processing in accordance with the first embodiment of the present invention.
Figure 12:
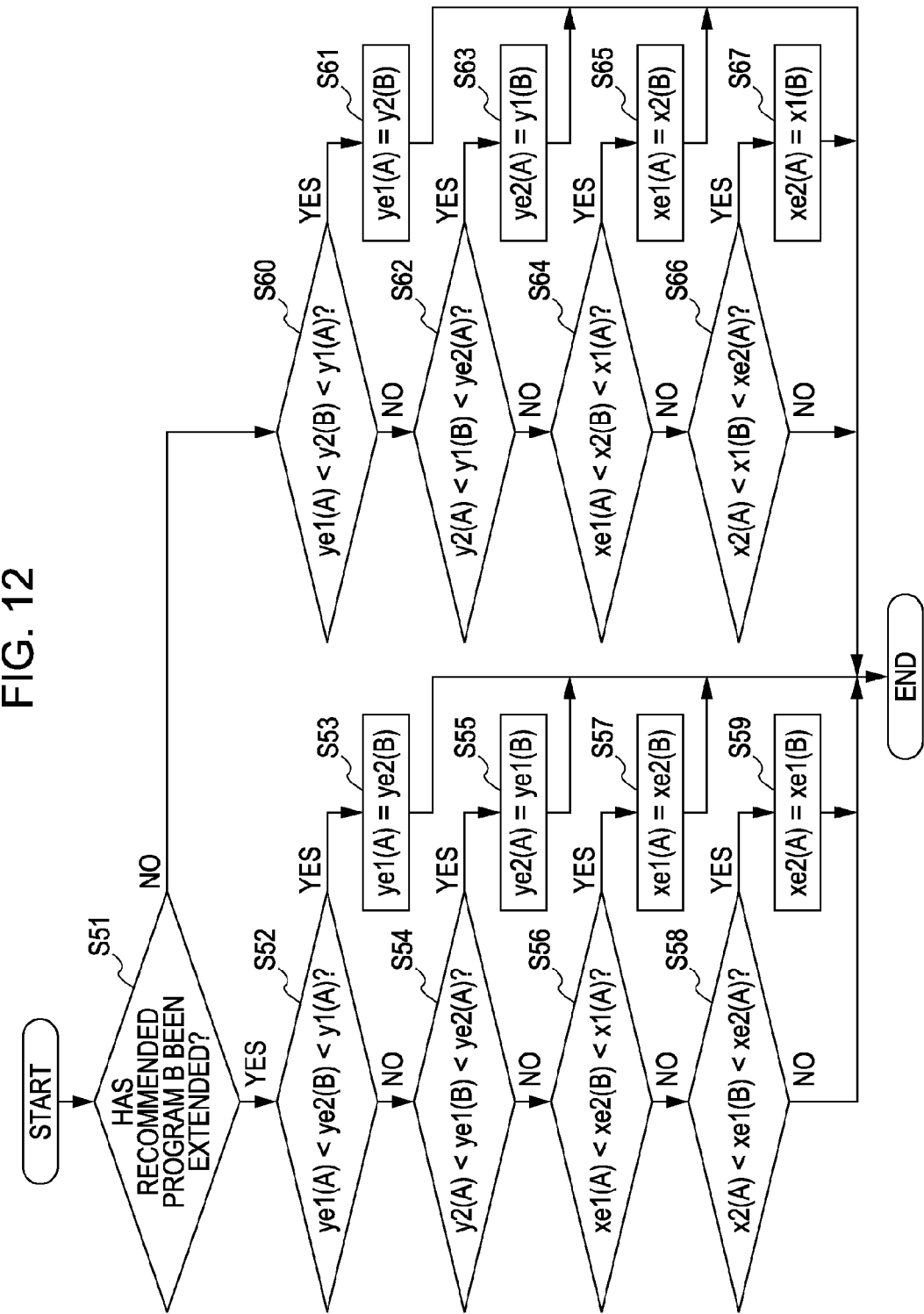
FIG. 12 is a flowchart illustrating processing for removing a portion to be extended beyond a boundary.

Details of the processing for removing an extended portion beyond a boundary in step S26 in FIG. 10 are discussed below with reference to the flowchart in FIG. 12. In FIG. 12, a recommended program extended as a popup window is set to be recommended program A, and the recommended program that is determined to overlap the recommended program A in step S25 in FIG. 10 is set to be recommended program B. The boundary is an outer line of the display area of program information concerning a recommended program other than the focused recommended program or an outer line of the display range of an EPG.

It is first determined in step S51 whether the recommended program B has been extended. If it is determined that the recommended program B has been extended, the process proceeds to step S52 to determine whether ye1(A)<ye2(B)< y1(A) holds true. That is, it is determined in step S52 whether the y coordinate ye2(B) at the bottom edge of the display area of the program information concerning the recommended program B is positioned between the y coordinate y1(A) at the top edge of the display area of the program information concerning the recommended program A before being extended and the y coordinate ye1(A) at the top edge of the program information concerning the recommended program A after being extended. If it is determined in step S52 that ye1(A)< ye2(B)<y1(A) holds true, the process proceeds to step S53 in which the y coordinate ye1(A) at the top edge of the display area of the program information concerning the recommended program A is changed to the y coordinate ye2(B). If it is determined in step S52 that ye1(A)<ye2(B)<y1(A) does not hold true, the process proceeds to step S54.

In step S54, it is determined whether y2(A)<ye1(B)<ye2 (A) holds true. That is, it is determined in step S54 whether the y coordinate ye1(B) at the top edge of the display area of the program information concerning the recommended program B is positioned between the y coordinate y2(A) at the bottom edge of the display area of the program information concerning the recommended program A before being extended and the y coordinate ye2(A) at the bottom edge of the display area of the program information concerning the recommended program A after being extended. If it is determined in step S54 that y2(A)<ye1(B)<ye2(A) holds true, the process proceeds to step S55 in which the y coordinate ye2(A) at the bottom edge of the display area of the program information concerning the recommended program A is changed to the y coordinate ye1(B). If it is determined in step S54 that y2(A)<ye1 (B)<ye2(A) does not hold true, the process proceeds to step S56.

In step S56, it is determined whether xe1(A)<xe2(B)<x1 (A) holds true. That is, it is determined in step S56 whether the x coordinate xe2(B) at the right edge of the display area of the program information concerning the recommended program B is positioned between the x coordinate x1(A) at the left edge of the display area of the program information concerning the recommended program A before being extended and the x coordinate xe1(A) at the left edge of the display area of the program information concerning the recommended program A after being extended. If it is determined in step S56 that xe1(A)<xe2(B)<x1(A) holds true, the process proceeds to step S57 in which the x coordinate xe1(A) at the left edge of the display area of the program information concerning the recommended program A is changed to the x coordinate xe2(B). If it is determined in step S56 that xe1(A)<xe2(B)< x1(A) does not hold true, the process proceeds to step S58.

In step S58, it is determined whether x2(A)<xe1(B)<xe2 (A) holds true. That is, it is determined in step S58 whether the x coordinate xe1(B) at the left edge of the display area of the program information concerning the recommended program B is positioned between the x coordinate x2(A) at the right edge of the display area of the program information concerning the recommended program A before being extended and the x coordinate xe2(A) at the right edge of the display area concerning the recommended program A after being extended. If it is determined in step S58 that x2(A)<xe1(B)< xe2(A) holds true, the process proceeds to step S59 in which the x coordinate xe2(A) at the right edge of the display area of the program information concerning the recommended program A is changed to the x coordinate xe1(B). If it is determined in step S58 that x2(A)<xe1(B)<xe2(A) does not hold true, the processing is completed without changing the coordinates.

If it is determined in step S51 that the recommended program B has not been extended, the process proceeds to step S60 to determine whether ye1(A)<y2(B)<y1(A) holds true. That is, it is determined in step S60 whether the y coordinate y2(B) at the bottom edge of the display area of the program information concerning the recommended program B before being extended is positioned between the y coordinate y1(A) at the top edge of the display area of the program information concerning the recommended program A before being extended and the y coordinate ye1(A) at the top edge of the display area of the program information concerning the recommended program A after being extended. If it is determined in step S60 that ye1(A)<y2(B)<y1(A) holds true, the process proceeds to step S61 in which the y coordinate ye1(A) at the top edge of the display area of the program information concerning the recommended program A is changed to the y coordinate y2(B). If it is determined in step S60 that ye1(A)<y2(B)<y1(A) does not hold true, the process proceeds to step S62.

In step S62, it is determined whether y2(A)<y1(B)<ye2(A) holds true. That is, it is determined in step S62 whether the y coordinate y1(B) at the top edge of the display area of the program information concerning the recommended program B before being extended is positioned between the y coordinate y2(A) at the bottom edge of the display area of the program information concerning the recommended program A before being extended and the y coordinate ye2(A) at the bottom edge of the display area of the program information concerning the recommended program A after being extended. If it is determined in step S62 that y2(A)<y1(B)<ye2(A) holds true, the process proceeds to step S63 in which the y coordinate ye2(A) at the bottom edge of the display area of the program information concerning the recommended program A is changed to the y coordinate y1(B). If it is determined in step S62 that y2(A)<y1(B)<ye2(A) does not hold true, the process proceeds to step S64.

In step S64, it is determined whether xe1(A)<x2(B)<x1(A) holds true. That is, it is determined in step S64 whether the x coordinate x2(B) at the right edge of the display area of the program information concerning the recommended program B before being extended is positioned between the x coordinate x1(A) at the left edge of the display area of the program information concerning the recommended program A before being extended and the x coordinate xe1(A) at the left edge of the display area of the program information concerning the recommended program A after being extended. If it is determined in step S64 that xe1(A)<x2(B)<x1(A) holds true, the process proceeds to step S65 in which the x coordinate xe1(A) at the left edge of the display area of the program information concerning the recommended program A is changed to the x coordinate x2(B). If it is determined in step S64 that xe1(A)<x2(B)<x1(A) does not hold true, the process proceeds to step S66.

In step S66, it is determined whether x2(A)<x1(B)<xe2(A) holds true. That is, it is determined in step S66 whether the x coordinate x1(B) at the left edge of the display area of the program information concerning the recommended program B before being extended is positioned between the x coordinate x2(A) at the right edge of the display area of the program information concerning the recommended program A before being extended and the x coordinate xe2(A) at the right edge of the display area of the program information concerning the recommended program A after being extended. If it is determined in step S66 that x2(A)<x1(B)<xe2(A) holds true, the process proceeds to step S67 in which the x coordinate xe2(A) at the right edge of the display area of the program information concerning the recommended program A is changed to the x coordinate x1(B). If it is determined in step S66 that x2(A)<x1(B)<xe2(A) does not hold true, the processing is completed without changing the coordinates.

The processing for determining whether the display area of the program information concerning the recommended program A would be extended out of the EPG frame in step S25 in FIG. 10 is as follows, though the flowchart of this processing is omitted here.

It is first determined whether the x coordinate xe1(A) at the left edge of the display area of the program information concerning the recommended program A is positioned farther toward the right than the x coordinate xm1 shown in FIG. 9 at the left edge of the display range of the EPG frame. Then, it is determined whether the x coordinate xe2(A) at the right edge of the display area of the program information concerning the recommended program A is positioned farther toward the left than the x coordinate xm2 shown in FIG. 9 at the right edge of the display range of the EPG frame. It is then determined whether the y coordinate ye1(A) at the top edge of the display area of the program information concerning the recommended program A is positioned farther toward the bottom than the y coordinate ym1 shown in FIG. 9 at the top edge of the display range of the EPG frame. It is then determined whether the y coordinate ye2(A) at the bottom edge of the display area of the program information concerning the recommended program A is positioned farther toward the top than the y coordinate ym2 shown in FIG. 9 at the bottom edge of the display range of the EPG frame.

If the above-described all the four conditions are satisfied, it is determined that the display area of the program information concerning the recommended program A would not be extended out of the display range of the EPG frame. On the other hand, if even one of the four conditions is not satisfied, it is determined that the display area of the program information concerning the recommended program A would be extended out of the display range of the EPG frame.

If the display area of the program information concerning the recommended program A would be extended out of the display range of the EPG frame, processing for removing an extended portion beyond the boundary (step S26 in FIG. 10) is performed as follows. The boundary is the outer line of the display range of the EPG frame, i.e., the line connecting the four coordinate points (xm1, ym1), (xm2, ym1), (xm2, ym2), and (xm1, ym2).

If the y coordinate ye1(A) at the top edge of the display area of the program information concerning the recommended program A is positioned farther toward the top than the y coordinate ym1 shown in FIG. 9 at the top edge of the display range of the EPG frame, the y coordinate ye1(A) is changed to the y coordinate ym1. If the y coordinate ye2(A) at the bottom edge of the display area of the program information concerning the recommended program A is positioned farther toward the bottom than the y coordinate ym2 shown in FIG. 9 at the bottom edge of the display range of the EPG frame, the y coordinate ye2(A) is changed to the y coordinate ym2. If the x coordinate xe1(A) at the left edge of the display area of the program information concerning the recommended program A is positioned farther toward the left than the x coordinate xm1 shown in FIG. 9 at the left edge of the display range of the EPG frame, the x coordinate xe1(A) is changed to the x coordinate xm1. If the x coordinate xe2(A) at the right edge of the display area of the program information concerning the recommended program A is positioned farther toward the right than the x coordinate xm2 shown in FIG. 9 at the right edge of the display range of the EPG frame, the x coordinate xe2(A) is changed to the x coordinate xm2.

Advantages of the first embodiment of the present invention are discussed below by comparing the EPG frame (FIG. 7) after extending the display areas of the program information concerning the recommended programs with the EPG frame (FIG. 8) before extending the display areas of the program information concerning the recommended program.

FIG. 8 shows that the display area of the recommended program 23 has a horizontal length for 7 characters (two-byte characters) and a vertical height for 4 rows. In contrast, FIG. 7 shows that the display area of the recommended program 23 has a horizontal length for 11 characters (two-byte characters) and a vertical height for 8 rows by vertically and horizontally extending the display area for 2 characters. In this manner, by extending the display area of program information concerning a recommended program as a popup window, detailed information concerning the recommended program can be displayed.

In the EPG frame shown in FIG. 7, the display areas of the program information concerning the recommended programs are arranged so that they are not overlapped with one another. As discussed with reference to FIG. 10, the recommended programs 23, 44, 54, 56, 64, 66, and 73 are sequentially subjected to re-layout processing in this order. In the re-layout processing for the recommended program 44, the extension in the rightward direction is restricted because of the presence of the recommended program 54 before subjected to re-layout processing on the right side. In the re-layout processing for the recommended program 54, the extensions in the rightward direction and in the leftward direction are restricted because of the presence of the recommended program 44 after subjected to re-layout processing on the left side and the recommended program 64 before subjected to re-layout processing on the right side. In the re-layout processing for the recommended program 56, the extensions in the upward direction and the downward direction are restricted because of the presence of the recommended program 66 before subjected to re-layout processing on the upper side and the presence of the boundary of the display range of the EPG frame on the lower side.

In the re-layout processing for the recommended program 64, the extensions in the leftward direction and in the downward direction are restricted because of the presence of the recommended program 54 after subjected to re-layout processing on the left side and the presence of the recommended program 66 before subjected to re-layout processing on the lower side. In the re-layout processing for the recommended program 66, the extensions in the leftward direction and in the rightward direction are restricted because of the presence of the recommended program 54 after subjected to re-layout processing on the left side and the presence of the recommended program 73 before subjected to re-layout processing on the right side. For the recommended program 66, because of the presence of the recommended program 64 after subjected to re-layout processing on the upper side and the recommended program 56 after subjected to re-layout processing on the lower side, the extensions in the upward direction and in the downward direction are also restricted. In the re-layout processing for the recommended program 73, the extensions in the leftward direction and in the upward direction are restricted because of the presence of the recommended program 66 after subjected to re-layout processing on the left side and the presence of the recommended program 64 after subjected to re-layout processing on the upper side. In this manner, the configurations of the display areas are changed so that the display areas of adjacent recommended programs are not overlapped with one another.

Accordingly, in the first embodiment, the display area of program information concerning each recommended program can be displayed so that it is not overlapped with the display areas of the program information concerning the other recommended programs. If many programs to be extended are positioned closely to one another, restrictions are imposed on the extensions of the program information so that the display areas of the program information are not overlapped with one another. Additionally, when extending the display areas of recommended programs as popup windows, the configurations of the display areas to be extended are changed in accordance with the positions of adjacent recommended programs. Thus, the extended display areas are not considerably displaced from the original display positions.

As described above, according to the first embodiment of the present invention, when display areas of program information concerning a plurality of recommended programs positioned close to one another are displayed as popup portions, program information desired by a user can be displayed in a form that can be easily recognized.

In the first embodiment, the left edge, right edge, top edge, and bottom edge of the display area of program information are each extended by a predetermined number of characters. Alternatively, the horizontal length and the vertical height of the display area determined in provisional layout processing may be extended by a predetermined factor (for example, 1.5).

If a large number of characters are indicated in the short event descriptor or the extended event descriptor of a program, a large number of characters are accordingly displayed in the display area of the program information. Accordingly, the degree by which the display area of such a program is extended may be increased.

Although in the first embodiment the channel is designated on the horizontal axis and the time zone is designated on the vertical axis, they may be reversed. Alternatively, other attributes, e.g., date, may be designated on the horizontal axis and the vertical axis.

In the first embodiment, an EPG frame is generated on the basis of EPG data extracted from broadcasting waves. However, an EPG frame may be generated on the basis of EPG data obtained via the Internet. Alternatively, an EPG frame may be generated by means of a program on a personal computer or on a world wide web (WWW) server.

Second Embodiment

Figure 13:
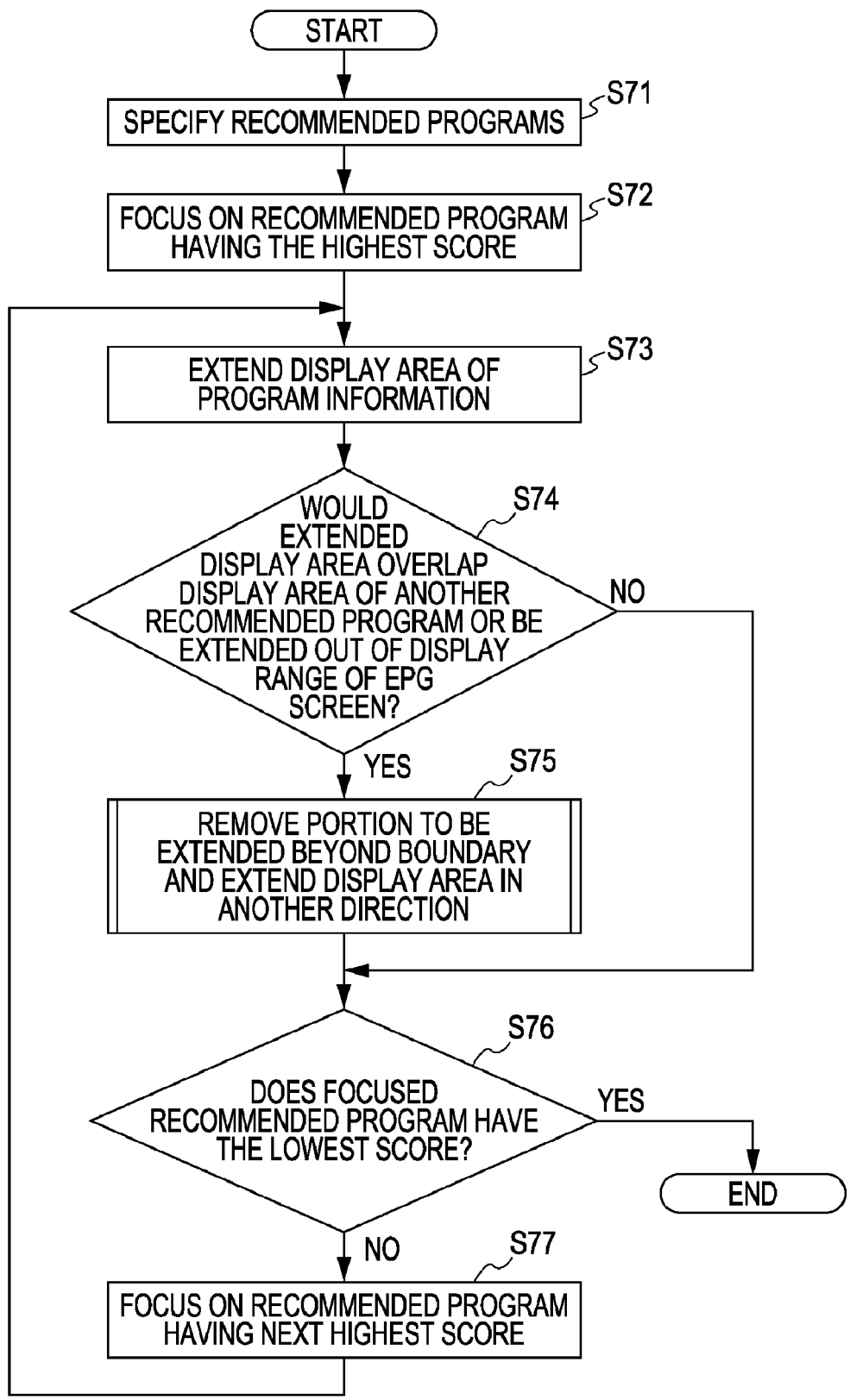
FIG. 13 is a flowchart illustrating re-layout processing in accordance with a second embodiment of the present invention.

In a second embodiment of the present invention, the re-layout processing is different from that of the first embodiment. The aspects other than the re-layout processing in the second embodiment are similar to those of the first embodiment. FIG. 13 is a flowchart illustrating re-layout processing employed in the second embodiment.

In step S71, recommended programs are specified from among a plurality of programs displayed on an EPG frame. More specifically, a score is determined on the basis of the degree by which each program matches predetermined conditions and is assigned to the program, and programs having scores higher than or equal to a predetermined value are specified as recommended programs. For example, weights are applied to categories or keywords that match user's preferences, and then, the weighted categories or keywords are registered in advance. Then, higher scores are given to programs that match the registered categories or keywords more accurately. Also, higher scores may be given to programs that were viewed or recorded more frequently in the past. If a program search condition (category or keyword) is specified, the degree by which each program matches the search condition may be reflected in the score given to the program. For example, if a plurality of search conditions are specified, higher scores are given to programs that match more search conditions. The score represents a priority level, and recommended programs having higher scores are preferentially displayed as popup windows.

Then, in step S72, the recommended program having the highest score (priority level) is focused. Then, in step S73, the display area of the program information concerning the focused recommended program is extended as a popup window. More specifically, the coordinate values x1, x2, y1, and y2 at the left edge, right edge, top edge, and bottom edge, respectively, determined in the provisional layout processing are each changed by a predetermined amount. That is, the left edge x1 is shifted to the left by an amount equal to n characters, the right edge x2 is shifted to the right by an amount equal to n characters, the top edge y1 is shifted toward the top by an amount equal to n characters, and the bottom edge y2 is shifted toward the bottom by an amount equal to n characters.

It is then determined in step S74 whether, as a result of the extension processing, the extended display area of the program information concerning the focused recommended program would overlap the display area of the program information concerning another recommended program or would be extended out of the display range of the EPG frame. If it is determined in step S74 that the extended display area would overlap the display area of another recommended program or would be extended out of the display range of the EPG frame, the process proceeds to step S75. In step S75, the portion to be extended beyond the boundary is removed, and then, the display area is extended by an amount equal to the removed portion in a direction other than the direction in which the portion to be extended is removed. More specifically, the display area is extended in the direction opposite the direction in which the extended portion is removed. If the display area cannot be extended in the opposite direction because it would reach another boundary in that direction, the removed portion is divided into two equal halves and is extended in the remaining two directions perpendicular to the opposite direction by an amount equal to each half. If the display area cannot be extended in either direction because it would reach another boundary in that direction, the display area is extended only in the other direction for an amount equal to the removed portion. With this arrangement, the size of the display area has to be reduced only when the display area reaches boundaries in all the four vertical and horizontal directions, and in other cases, the original size of the display area can be maintained as large as possible. Details of this processing are discussed below.

Then, in step S76, it is determined whether the focused program is a recommended program having the lowest score (priority level). If it is determined in step S76 that the focused program is not a program having the lowest score, the process proceeds to step S77. In step S77, the recommended program having the next highest score is focused, and the process returns to step S73. In this manner, steps S73 through S77 are repeated for all the recommended programs in descending order of the higher score. When the re-layout processing is finished for the recommended program having the lowest score (priority level), the re-layout processing is completed.

Details of the processing for removing an extended portion beyond a boundary and extending the display area in another direction by an amount equal to the removed portion in step S75 are given below with reference to the flowchart in FIG. 14.

In step S81, among the four vertical and horizontal directions, one direction in which the display area of the program information concerning the recommended program would overlap the display area of another recommended program or would be extended out of the display range of the EPG frame is focused. Then, in step S82, the portion to be extended beyond the boundary (with the display area of the program information concerning another recommended program or the display range of the EPG frame) is removed. More specifically, in step S82, if the focused direction is the leftward direction, the x coordinate at the left edge of the display area of the program information is adjusted to the x coordinate of the boundary. If the focused direction is the rightward direction, the x coordinate at the right edge of the display area of the program information is adjusted to the x coordinate of the boundary. If the focused direction is the upward direction, the y coordinate at the top edge of the display area of the program information is adjusted to the y coordinate of the boundary. If the focused direction is the downward direction, the y coordinate at the bottom edge of the display area of the program information is adjusted to the y coordinate of the boundary.

It is then determined in step S83 whether it is possible to extend the display area in the direction opposite the focused direction. In this case, if the side in the direction opposite the focused direction does not exceed a boundary in that direction, it is determined in step S83 that the display area can be extended in the opposite direction. Then, the process proceeds to step S84 in which the display area is extended in the opposite direction by an amount equal to the removed portion. On the other hand, if the side in the direction opposite the focused direction is positioned on the boundary, it is determined in step S83 that it is not possible to extend the display area, and the process proceeds to step S85. In step S85, the display area is divided into two equal halves and is extended in the two directions perpendicular to the focused direction by an amount equal to each half.

Then, in step S86, it is determined whether there is any direction other than the focused direction in which the display area of the program information concerning the focused program would overlap the display area of the program information concerning another recommended program or would be extended out of the display range of the EPG frame. If it is determined in step S86 that there is such a direction, the process proceeds to step S87 in which such a direction is focused. The process then returns to step S82. Steps S82 through S87 are repeated until none of the four sides (top edge, bottom edge, left edge, and right edge) would overlap the display area of the program information concerning another recommended program or would be extended out of the display range of the EPG frame. If it is determined in step S86 that there is no direction in which the display area of the program information concerning the focused program would overlap a boundary, the processing is completed.

FIGS. 15A through 15E illustrate examples of frames to explain the processing shown in FIG. 14. In FIG. 15A, an extended recommended program 54 and a recommended program 66 which has not yet been extended are located around an extended recommended program 56. The recommended program 56 is in contact with the bottom edge of the EPG frame. The left edge, the right edge, the top edge, and the bottom edge of the recommended program 56 are each extended by a predetermined amount (for example, two characters) (step S73 in FIG. 13).

In FIG. 15B, since the right edge of the recommended program 56 would overlap the recommended program 66 (step S81), the portion at the right edge to be extended beyond the boundary is removed (step S82), and the left edge of the display area of the recommended program 56 is extended by an amount equal to the removed portion (steps S83 and S84).

In FIG. 15C, since the bottom edge of the recommended program 56 would be extended out of the EPG frame (steps S86 and S87), the portion to be extended beyond the boundary of the EPG frame is removed (step S82), and the top edge of the recommended program 56 is extended by an amount equal to the removed portion (steps S83 and S84).

In FIG. 15D, since the top edge of the recommended program 56 would overlap the display area of the recommended program 54 (steps S86 and S87), the portion to be extended beyond the boundary is removed (step S82), and the left and right edges of the recommended program 56 are extended by an amount equal to each half of the removed portion (steps S83 and S85).

In FIG. 15E, since the right edge of the recommended program 56 would overlap the display area of the recommended program 66 (steps S86 and S87), the portion to be extended beyond the boundary is removed (step S82), and the left edge of the recommended program 56 is extended by an amount equal to the removed portion (steps S83 and S84). In the state shown in FIG. 15E, the display area of the recommended program 56 does not overlap the display area of program information concerning another program or is not extended out of the display range of the EPG frame in any of the four directions. Thus, the extension processing for the recommended program 56 is completed.

Figure 16:
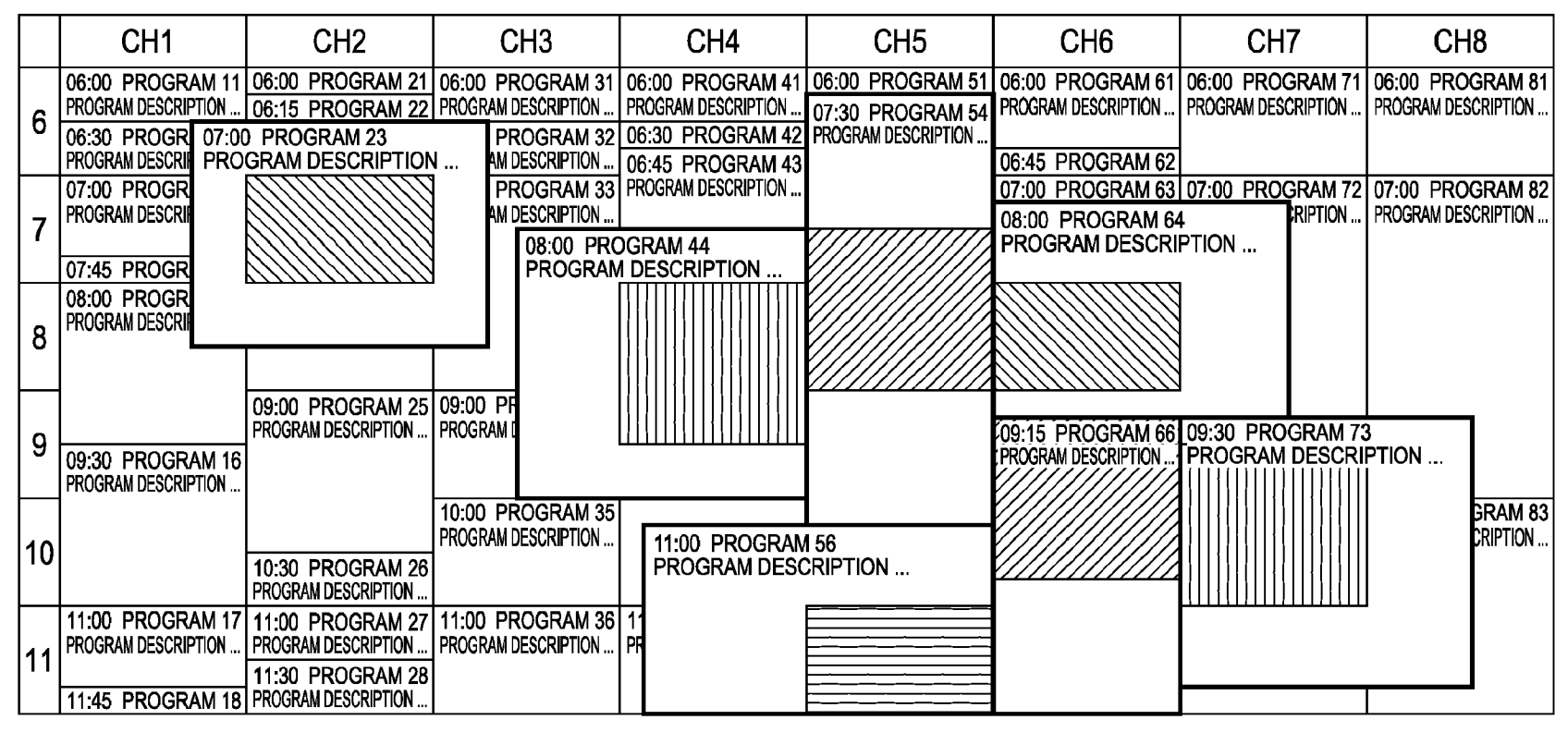

Advantages of the second embodiment are described below, with reference to FIGS. 16 and 17, by comparing the layouts of recommended programs when scores (priority levels) of the recommended program are different. FIG. 16 illustrates an EPG frame when re-layout processing is performed in the order of the recommended programs 23, 44, 54, 56, 64, 66, and 73. FIG. 17 illustrates an EPG frame when re-layout processing is performed in the order of the recommended programs 66, 23, 44, 54, 56, 64, and 73. FIGS. 16 and 17 illustrate the EPG frames when the display areas are extended vertically and horizontally by an amount equal to two characters in each direction in step S24 (see FIG. 10).

In FIG. 16, because of the presence of the recommended program 73, which has not yet been extended, in the rightward direction, the presence of the extended recommended programs 54 and 56 in the leftward direction, and the presence of the extended recommended program 64 in the upward direction, the extensions of the display area of the recommended program 66 having the second lowest score (priority level) are restricted in the upward, leftward, and rightward directions. As a result, the display area of the recommended program 66 has a horizontal length of 7 characters and a vertical height of 6 rows.

In the EPG frame shown in FIG. 17, the recommended program 66 having the highest score (priority level) is preferentially extended before the other recommended programs. Since the extensions of the recommended program 66 are restricted in the rightward, the upward, and the downward directions because of the presence of other recommended programs, the recommended program 66 is extended in the leftward direction by an amount equal to the restricted portions. As a result, the display area of the recommended program 66 has a horizontal length of 14 characters and a vertical height of 8 rows. Accordingly, the number of characters of the recommended program 66 is substantially the same as that of a recommended program that has extended vertically and horizontally by an amount equal to two characters in each direction (11 characters×10 rows).

In FIG. 16, the sizes of the display areas of all the recommended programs other than the recommended program 66 are not reduced from the sizes of the display areas that were extended in the re-layout processing in step S24 (see FIG. 10). In FIG. 17, the sizes of the display areas of all the recommended programs other than the recommended program 54 are not reduced from the sizes of the display areas that were extended in the re-layout processing in step S24 (see FIG. 10).

As described above, in the second embodiment as well as the first embodiment, when the display areas of the program information concerning a plurality of recommended programs positioned close to one another are displayed as popup portions, program information desired by the user can be displayed in a form that can be easily recognized. Additionally, even if many programs to be extended are positioned close to one another, the sizes of the display areas that were extended are not reduced as long as one of the upward, downward, leftward, and rightward directions would not overlap a boundary. As a result, more detailed program information can be displayed.

Additionally, the display areas of the program information concerning recommended programs having higher scores (priority levels) can be preferentially extended. As a result, more detailed information can be displayed.

In the second embodiment, the left edge, right edge, top edge, and bottom edge of the display area of program information are each extended by an amount equal to a predetermined number of characters. Alternatively, the horizontal length and the vertical height of the display area determined in provisional layout processing may be extended by a predetermined factor (for example, 1.5).

If a large number of characters are indicated in the short event descriptor or the extended event descriptor of a program, a large number of characters are accordingly displayed in the display area of the program information. Accordingly, the degree by which the display area of such a program is extended may be increased. Alternatively, the degree by which a recommended program having a higher score (priority level) is extended may be increased.

Third Embodiment

Figure 18:
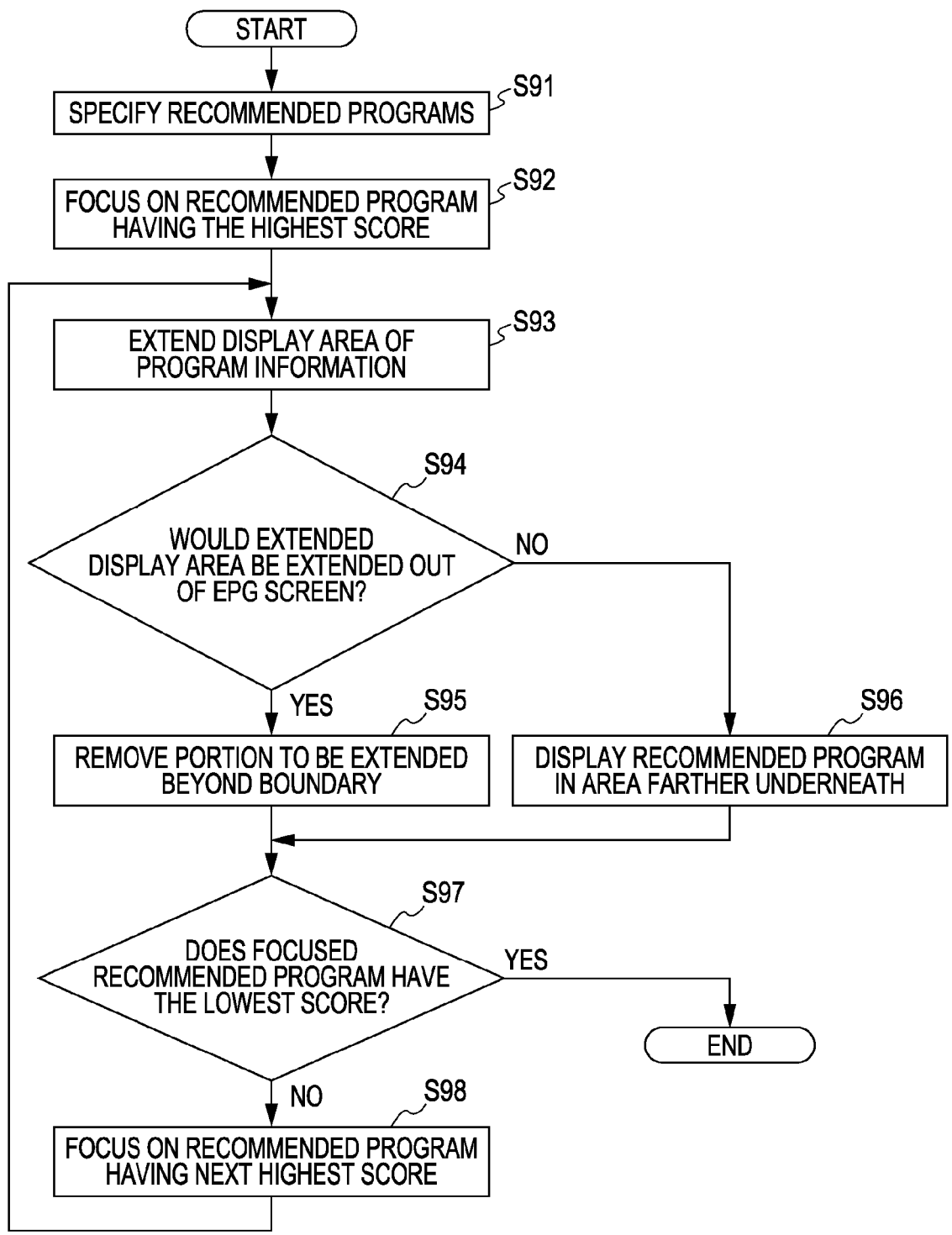
FIG. 18 is a flowchart illustrating re-layout processing in accordance with a third embodiment of the present invention.

In a third embodiment of the present invention, the re-layout processing is different from that of the first or second embodiment. The aspects other than the re-layout processing in the third embodiment are similar to those of the first or second embodiment. FIG. 18 is a flowchart illustrating re-layout processing employed in the third embodiment. In FIG. 18, steps S91 through S93, S97, and S98 are similar to steps S71 through S73, S76, and S77, respectively, in FIG. 13, and an explanation thereof is thus omitted here.

It is determined in step S94 whether, as a result of the extension processing in step S93, the display area of the program information concerning the recommended program would be extended out of the display range of the EPG frame. If it is determined in step S94 that the display area would be extended out of the EPG frame, the process proceeds to step S95. In step S95, the portion to be extended beyond the boundary of the display range is removed. If it is determined in step S94 that the display area would not be extended out of the EPG frame, the process proceeds to step S96. In step S96, the display area of the recommended program is displayed in an area farther underneath than the display areas of the other recommended areas subjected to re-layout processing. The display area of the recommended program having the highest score (priority level) that is first subjected to re-layout processing is displayed in an area on top of the display areas of the other recommended programs, and then, the display area of the recommended program that is subsequently subjected to re-layout processing is displayed in an area underneath the display area of the recommended program having the highest score. With this arrangement, the display areas of a plurality of recommended programs are displayed by being overlapped with one another in descending order of the higher priority levels.

It is then determined in step S97 whether the focused program is a recommended program having the lowest score (priority level). If it is determined in step S97 that the focused program is not a recommended program having the lowest score, the process proceeds to step S98. In step S98, the recommended program having the next highest score is focused, and the process then returns to step S93. In this manner, steps S93 through S97 are repeated in the descending order of the higher scores. If re-layout processing is finished for the recommended program having the lowest score, the re-layout processing is completed.

In the third embodiment, recommended programs are sequentially subjected to re-layout processing in descending order of higher scores. Conversely, recommended programs may be sequentially subjected to re-layout processing in ascending order of higher scores, and the recommended program subjected to re-layout processing most recently may be disposed on top of the other recommended program. Alternatively, the same result may be obtained by the following approach. The recommended programs may be subjected to re-layout processing in the order of channels or broadcast times, and then, the recommended program subjected to re-layout processing most recently may be disposed in the order of higher scores.

When drawing the display areas of the program information concerning the programs after being subjected to the re-layout processing, the display areas of the program information concerning programs other than the recommended programs are first drawn, and then, the display areas of the program information concerning the recommended programs are sequentially drawn from the underneath so that they are overlaid from the underneath to the top. Alternatively, a window system, e.g., X Window System, may be used so that the display areas of the program information concerning the programs can be managed as individual windows. In this case, it is not essential that the windows are sequentially drawn from the underneath to the top, in which case, an instruction concerning the order in which the windows are overlapped may be given to the window system.

The coordinate values of the display areas of the program information concerning the programs after being subjected to the re-layout processing in the third embodiment are stored in the memory 21 in the data format (xe1, ye1, xe2, ye2) shown in FIG. 6. Additionally, since the display areas of the program information concerning the recommended programs are overlapped with one another, the numbers representing the order in which the display areas are overlapped (e.g., 1, 2, 3, and so on representing the order from the underneath to the top) are determined and are stored in the memory 21 in the data format shown in FIG. 6.

Figure 19:
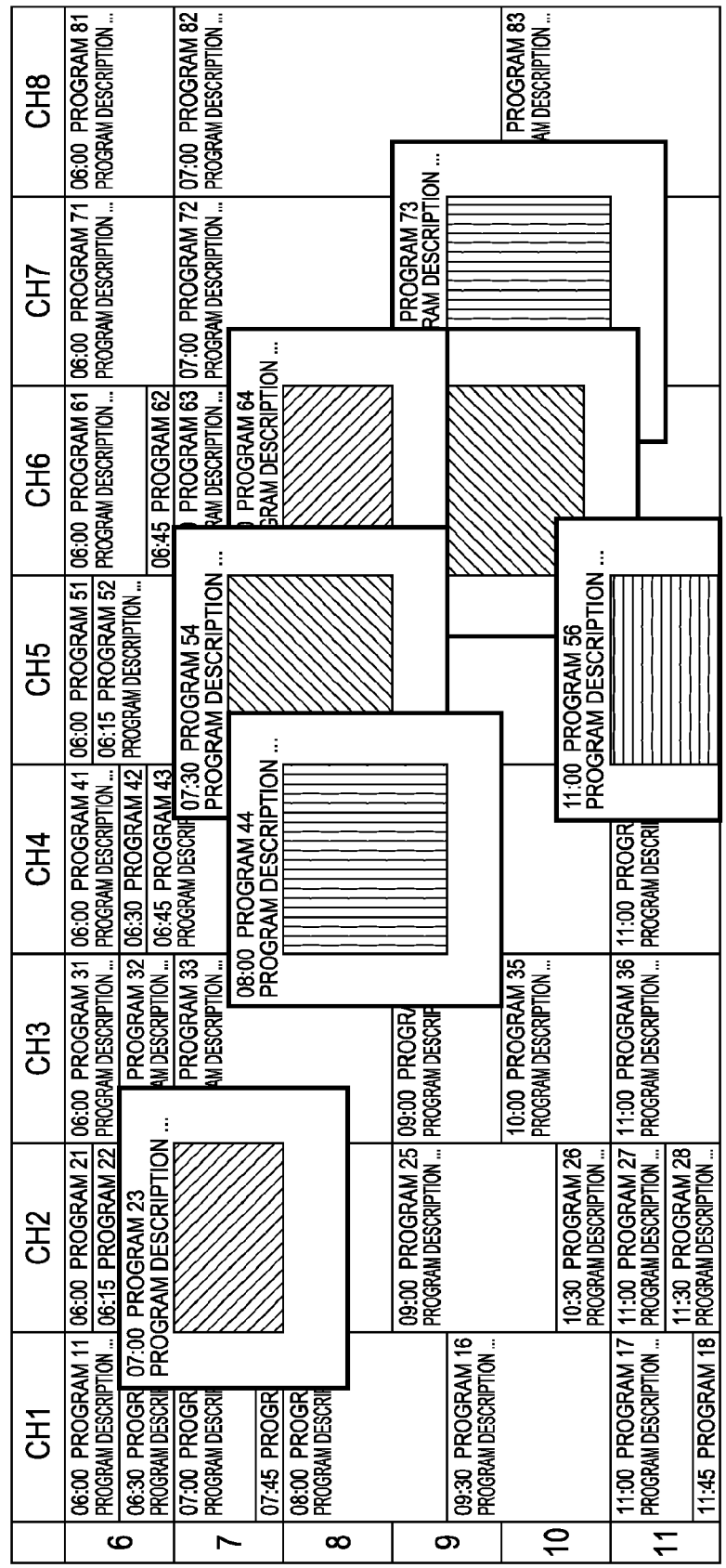
FIGS. 19, 20, and 21 are diagrams respectively illustrating first, second, and third examples of EPG frames after performing the re-layout processing in accordance with the third embodiment of the present invention.
Figure 20:
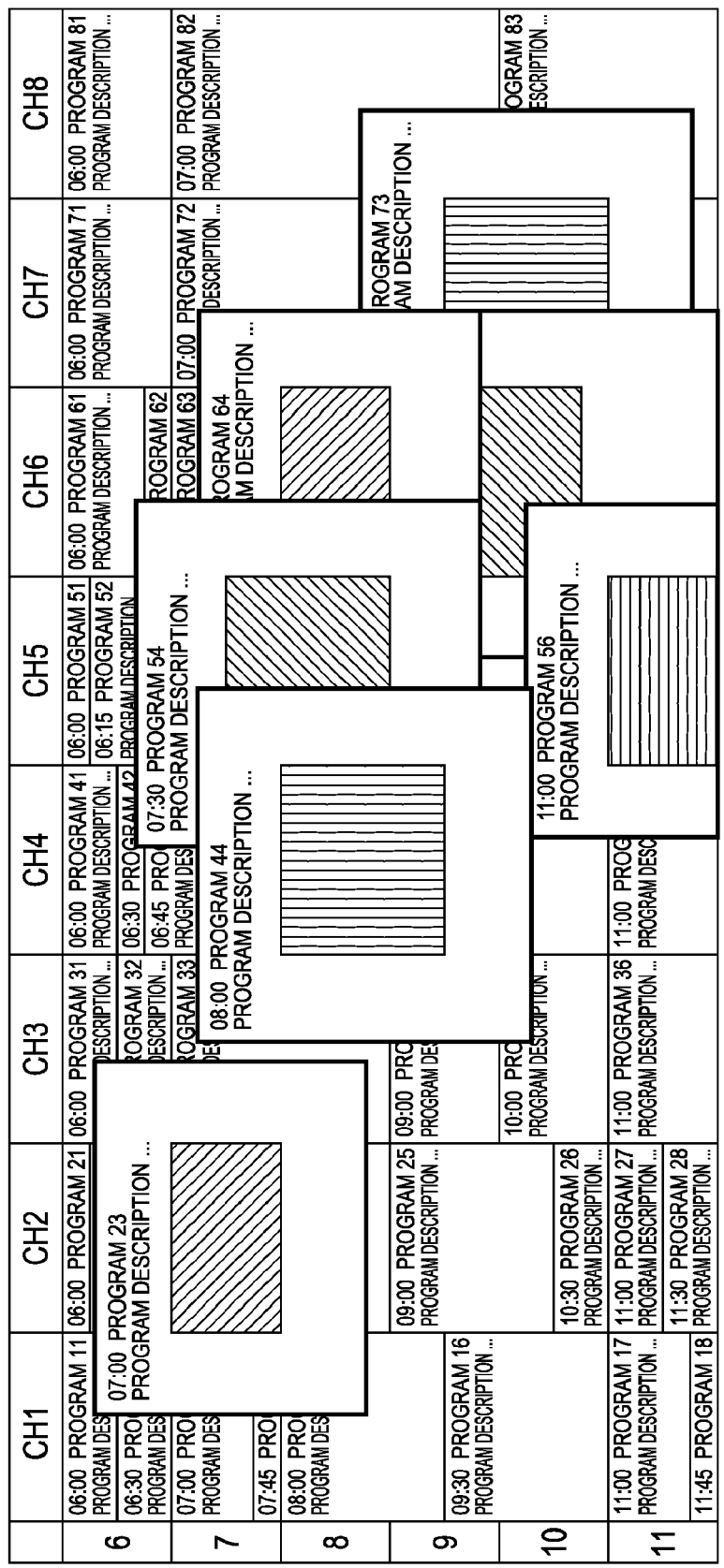
Figure 21:
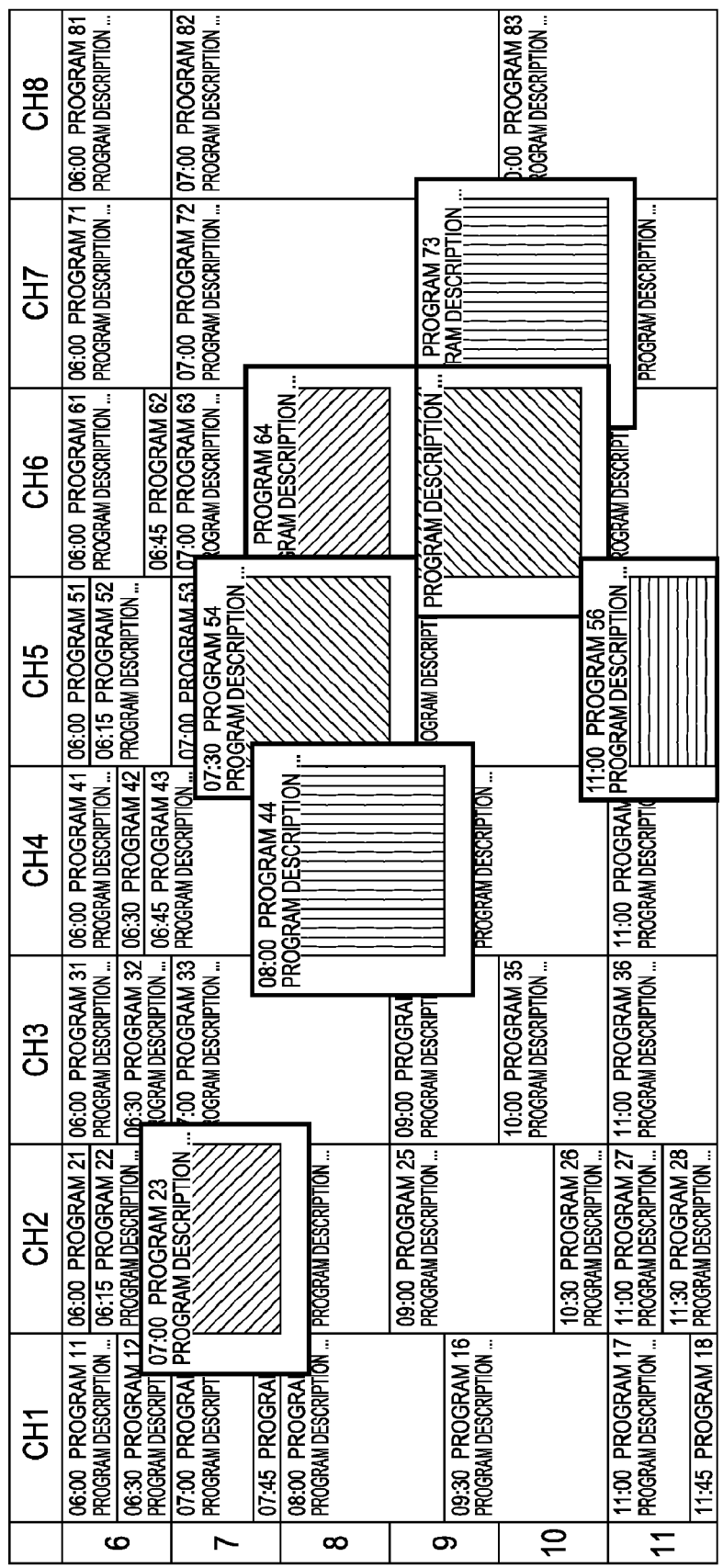

Advantages of the third embodiment are discussed below with reference to FIGS. 19 through 21. FIG. 19 illustrates an example of an EPG frame when the display areas of program information concerning the recommended programs are extended vertically and horizontally by an amount equal to two characters in each direction in the re-layout processing in step S93 (see FIG. 18). In the example shown in FIG. 19, the recommended programs are sequentially displayed in the descending order of higher scores (priority levels), such as in the order of the recommended programs 23, 44, 54, 56, 64, 66, and 73.

In the state in which the EPG frame shown in FIG. 19 is being displayed, if the user presses the plus button 54 of the remote controller 2, re-layout processing is performed by increasing the degree by which the display areas of the recommended programs are extended. As a result, as shown in the EPG frame in FIG. 20, the display areas of the recommended programs are extended vertically and horizontally by an amount equal to 3 characters in each direction. In the state in which the EPG frame shown in FIG. 19 is being displayed, if the user presses the minus button 55 of the remote controller 2, re-layout processing is performed by decreasing the degree by which the display areas of the recommended programs are extended. As a result, as shown in the EPG frame in FIG. 21, the display areas of the recommended programs are extended vertically and horizontally by an amount equal to one character in each direction. In this manner, by increasing or decreasing the degree by which the display areas of recommended programs are extended by the use of the plus button 54 or the minus button 55, respectively, of the remote controller 2, the user can decide whether to display greater detailed information concerning recommended programs or to display more items of information concerning programs concealed behind before.

As described above, in the third embodiment, the display areas of recommended programs having higher scores are displayed on top by being overlapped with the display areas of the other recommended programs. Accordingly, even if the display areas of many recommended programs are positioned close to one another, information concerning recommended programs having higher priority levels is preferentially displayed on top.

Hitherto, if the display areas of many recommended programs positioned close to one another are shifted so as to not be overlapped with one another, the positions of the display areas may be displaced from the original positions of the recommended programs by a considerable distance. This makes it difficult for the users to recognize the channels or broadcast times of the recommended programs. In contrast, in the third embodiment, recommended programs having higher scores (priority levels) are displayed on top without displacing the display areas of the program information concerning the recommended programs from the original positions by a considerable distance. Thus, when the display areas of the program information concerning a plurality of recommended programs positioned closed to one another are displayed as popup portions, program information desired by the user can be displayed in a form that can be easily recognized.

In the third embodiment, opaque display areas of program information concerning programs are overlapped with one another. Alternatively, translucent display areas of program information may be overlapped with one another so that the characters of the programs concealed underneath can be palely seen through. That is, the display areas of the program information concerning the programs other than the recommended programs may be drawn opaquely, and then, the display areas of the program information concerning the recommended programs may be sequentially drawn with the opacity $\alpha$ ($0<\alpha<1$) so that they are overlapped with one another from the underneath to the top. If the RGB component values of the drawn pixels are indicated by (R0, G0, B0) and if the RGB component values of new pixels to be overlapped on top of the drawn pixels are indicated by (R1, G1, B1), the resulting overlapped RGB component values are represented by $((1-\alpha)\times R0+\alpha\times R1, (1-\alpha)\times G0+\alpha\times G1, (1-\alpha)\times B0+\alpha\times B1)$. In this case, since the characters of recommended programs positioned farther underneath (i.e., recommended programs having lower scores) pass through more translucent layers, they are displayed with lower contrast. That is, the characters of recommended programs having higher scores (priority levels) are displayed more clearly.

Other Embodiments

The processing described in the above embodiments may be realized by providing a storage medium, storing program codes of software realizing the above-described functions, to a computer system or apparatus. By reading the program codes stored in the storage medium with a computer (or a CPU or MPU) of the system or apparatus and executing them, the functions of the above-described embodiments can be realized. In this case, the program codes read from the storage medium realize the functions according to the embodiments, and the storage medium storing the program codes constitutes the invention. The storage medium, such as a floppy disk, a hard disk, an optical disk, a magneto-optical disk and the like can be used for providing the program codes. Also, CD-ROM, CD-R, a magnetic tape, a non-volatile memory card, ROM, and the like can be used.

Furthermore, the functions according to the above embodiments are realized not only by executing the program codes read by the computer. The present invention also includes a case where an operating system (OS) or the like working on the computer performs part or the entire processes in accordance with designations of the program codes and realizes the functions according to the above embodiments.

Furthermore, the program codes read from the storage medium may be written in a function expansion card which is inserted into the computer or in a memory provided in a function expansion unit which is connected to the computer. Thereafter, a CPU or the like contained in the function expansion card or unit may perform part or the entire processes in accordance with designations of the program codes and may realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2006-241336 filed Sep. 6, 2006, which is hereby incorporated by reference herein in its entirety.

What is claimed is:

1. An apparatus for generating an electronic program guide including: program information concerning a plurality of programs, which program information is arranged on a two-dimensional coordinate system having a coordinate axis corresponding to a first program attribute and a coordinate axis corresponding to a second program attribute, the apparatus comprising:
   a specifying unit configured to specify a program which meet a predetermined condition from among the plurality of programs;
   a determination unit configured to determine a priority level for each program specified by the specifying unit on the basis of a predetermined condition; and
   an extension unit configured to extend a display area of the program specified by the specifying unit as a popup portion in descending order of higher priority levels determined by the determination unit,
   wherein, when extending the display area of a first specified program as a popup portion, the extension unit is configured to change a configuration of the display area of the first specified program so that the display area of the first specified program does not overlap a display area of a second specified program positioned close to the display area of the first specified program, and
   wherein, when extending the display area of the first specified program if the display area of the second specified program has not yet been extended, the extension unit restricts an extension of a portion of the display area of the first specified program so as to not overlap the display area of the second specified program before being extended, and if the display area of the second specified program has already been extended, the extension unit restricts an extension of a portion of the display area of the first specified program so as to not overlap the display area of the second specified program after being extended.

2. An apparatus according to claim 1, wherein, when extending the display area of the first specified program, if the extension unit has restricted an extension of a portion of the display area of the first specified program so as to not overlap the display area of the second specified program, the extension unit is configured to further extend the display area of the first specified program in a direction opposite the direction in which an extension is restricted.

3. An apparatus according to claim 2, wherein, if the display area of the first specified program would overlap a display area of a third specified program when extended in the opposite direction, the extension unit restricts an extension of a portion of the display area of the first specified program so as to not overlap the display area of the third specified program, and further extends the display area of the first specified program in a direction perpendicular to the opposite direction by an amount equal to the amount by which the portion is restricted by the extension unit.

4. An apparatus according to claim 1, further comprising:
   a display control unit configured to display the display area of the specified program extended by the extension unit in a manner different from the display area of the specified program before being extended.

5. A control method for an apparatus for generating an electronic program guide including: program information concerning a plurality of programs, which program information is arranged on a two-dimensional coordinate system having a coordinate axis corresponding to a first program attribute and a coordinate axis corresponding to a second program attribute, the control method comprising the steps of:
   specifying a program which meets a predetermined condition from among the plurality of programs;
   determining a priority level for each program specified in the specifying step on the basis of a predetermined condition; and
   extending, as a popup portion in descending order of higher priority levels determined in the determining step, a display area of the program specified in the step of specifying,
   wherein, in the step of extending, when extending the display area of a first specified program as a popup portion, a configuration of the display area of the first specified program is changed so that the display area of the first specified program does not overlap a display area of a second specified program positioned close to the display area of the first specified program, and
   wherein, when extending the display area of the first specified program, if the display area of the second specified program has not yet been extended, an extension of a portion of the display area of the first specified program is restricted so as to not overlap the display area of the second specified program before being extended, and if the display area of the second specified program has already been extended, an extension of a portion of the display area of the first specified program is restricted so as to not overlap the display area of the second specified program after being extended.

6. A control method according to claim 5, wherein, in the step of extending, when extending the display area of the first specified program, if an extension of a portion of the display area of the first specified program has been restricted so as to not overlap the display area of the second specified program, the display area of the first specified program is further extended in a direction opposite the direction in which an extension is restricted.

7. A control method according to claim 6, wherein, in the step of extending, if the display area of the first specified program would overlap a display area of a third specified program when extended in the opposite direction, an extension of a portion of the display area of the first specified program is restricted so as to not overlap the display area of the third specified program, and the display area of the first specified program is further extended in a direction perpendicular to the opposite direction by an amount equal to the amount by which the portion is restricted.

8. A control method according to claim 5, further comprising the step of:

controlling the display area of the specified program extended in the step of extending to be displayed in a manner different from the display area of the specified program before being extended.

9. A non-transitory computer-readable storage medium storing a computer-executable program for implementing a method according to claim 5.

* * * * *